April 7, 1964  M. M. SHERIFF ETAL  3,127,966
ACCELERATOR PEDAL CONTROLLED BRAKE SYSTEM
Filed Aug. 22, 1958  7 Sheets-Sheet 1
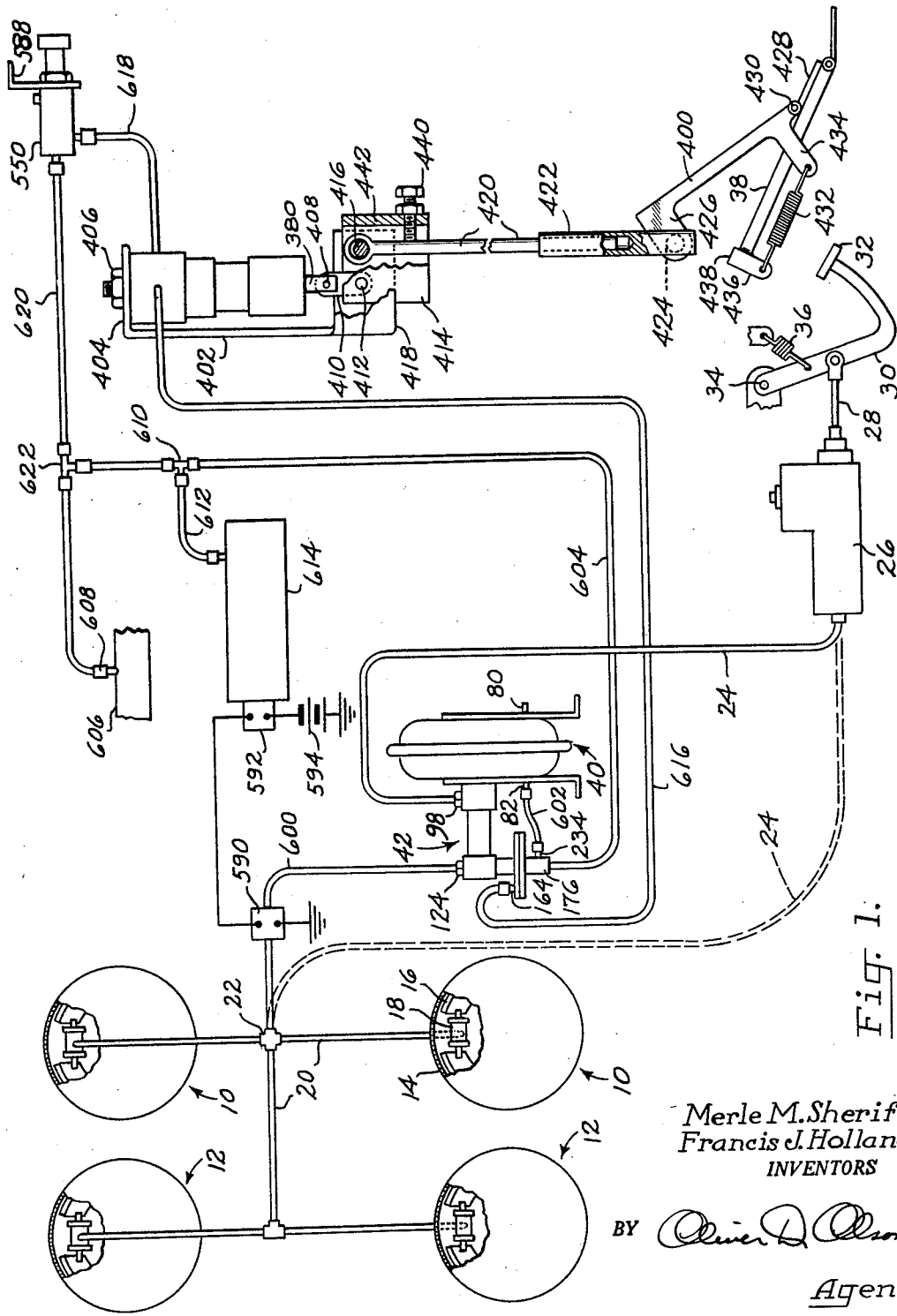
Fig. 1.
Merle M. Sheriff
Francis J. Holland
INVENTORS
BY 
Agent Merle M. Sheriff
Francis J. Holland
INVENTORS BY *Oliver D. Olson*
Agent April 7, 1964   M. M. SHERIFF ETAL   3,127,966
ACCELERATOR PEDAL CONTROLLED BRAKE SYSTEM
Filed Aug. 22, 1958   7 Sheets-Sheet 3
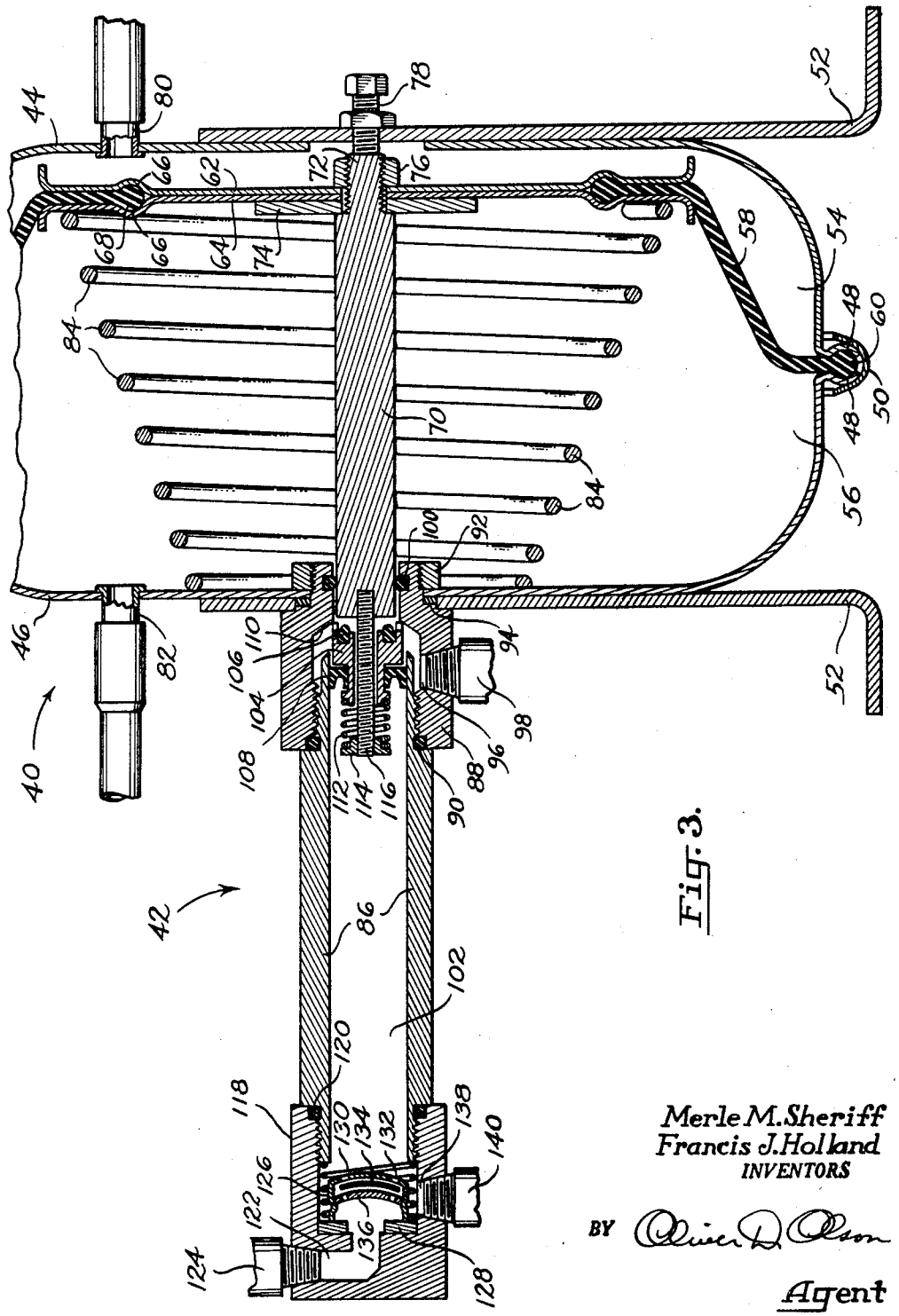
Fig. 3.
Merle M. Sheriff
Francis J. Holland
INVENTORS
BY 
Agent April 7, 1964   M. M. SHERIFF ETAL   3,127,966
ACCELERATOR PEDAL CONTROLLED BRAKE SYSTEM
Filed Aug. 22, 1958   7 Sheets-Sheet 4

Merle M. Sheriff
Francis J. Holland
INVENTORS

BY Olivier D. Olson
Agent

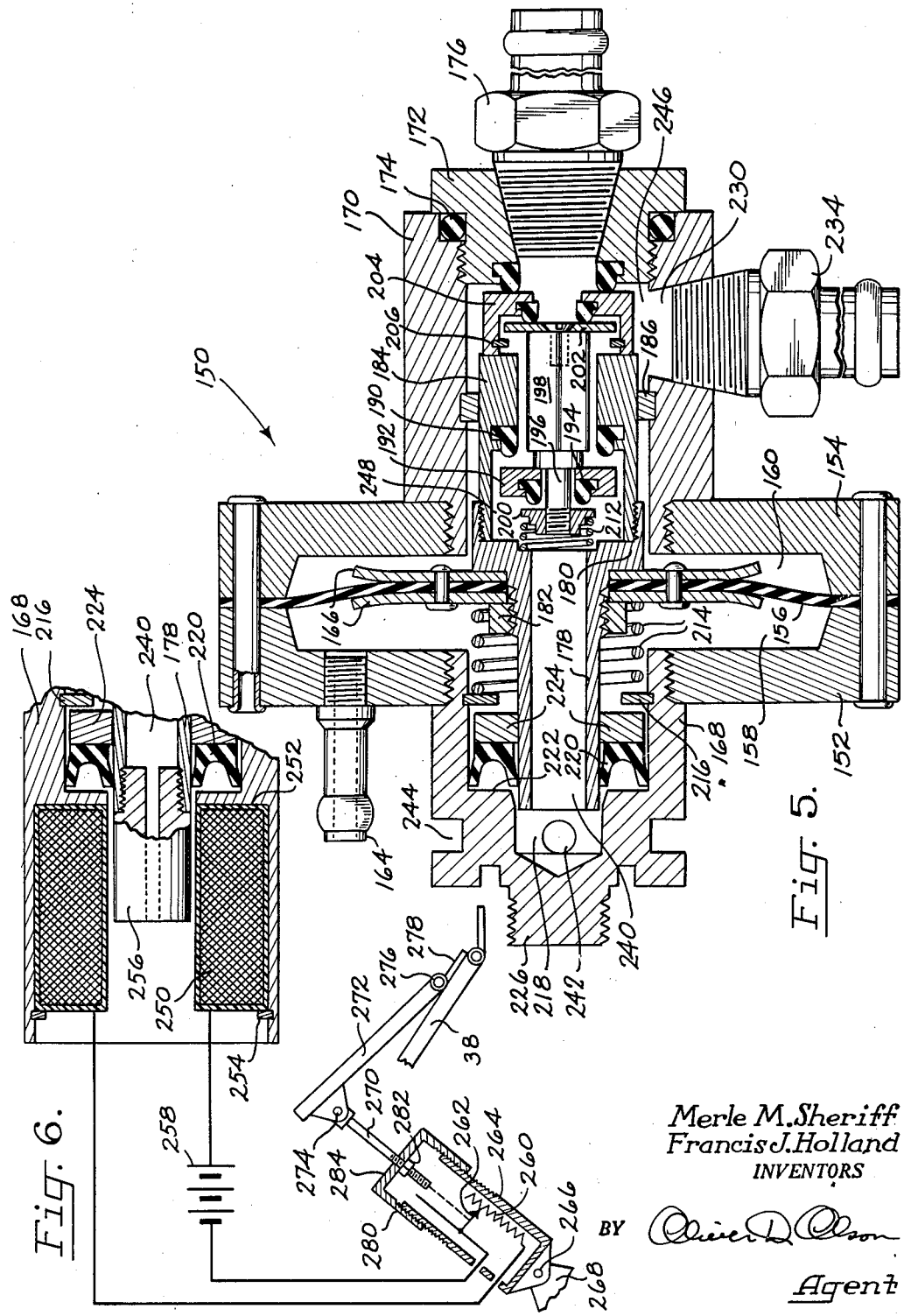

April 7, 1964  M. M. SHERIFF ETAL  3,127,966
ACCELERATOR PEDAL CONTROLLED BRAKE SYSTEM
Filed Aug. 22, 1958  7 Sheets-Sheet 6
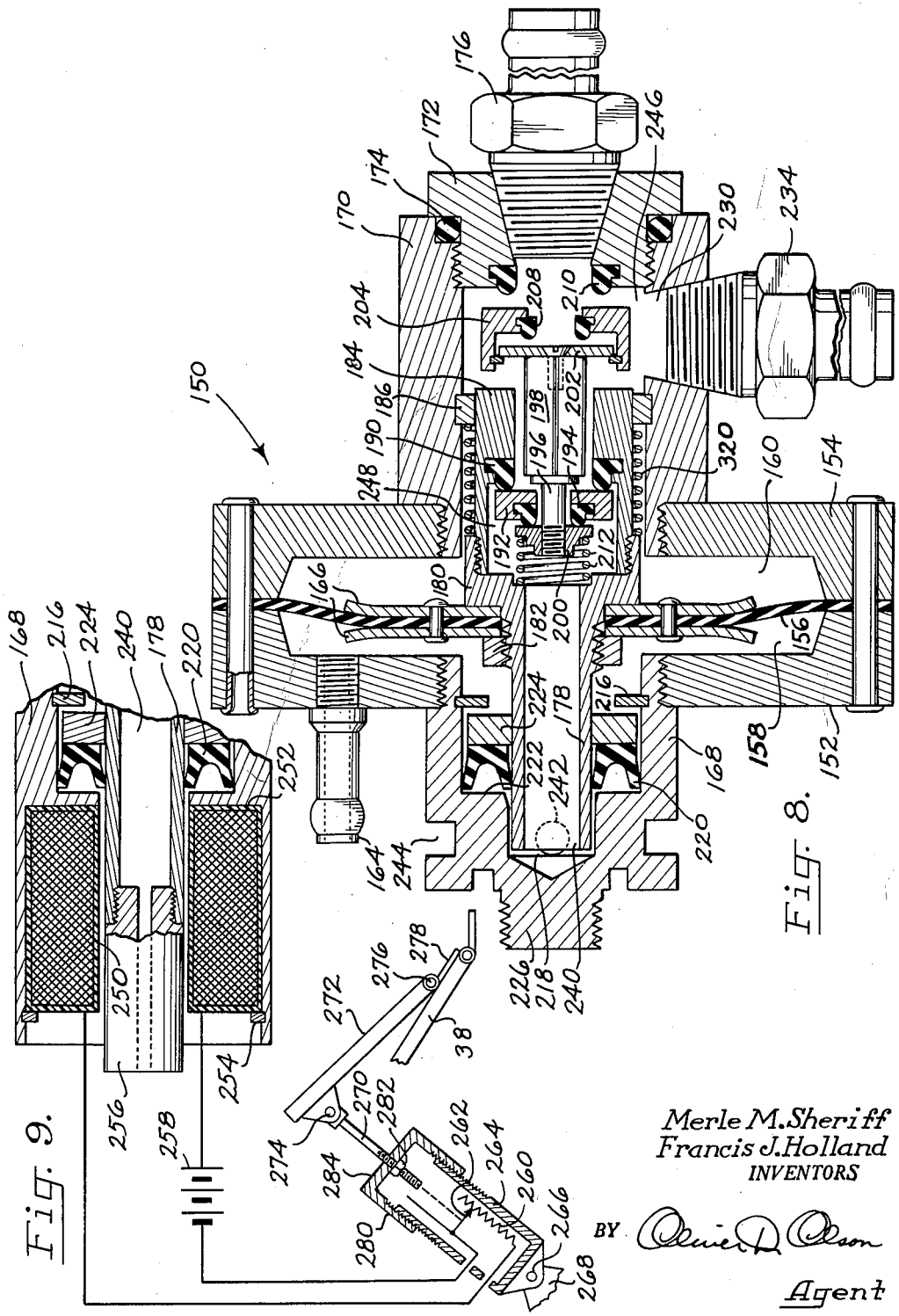
Merle M. Sheriff
Francis J. Holland
INVENTORS
BY Oliver D. Olson
Agent

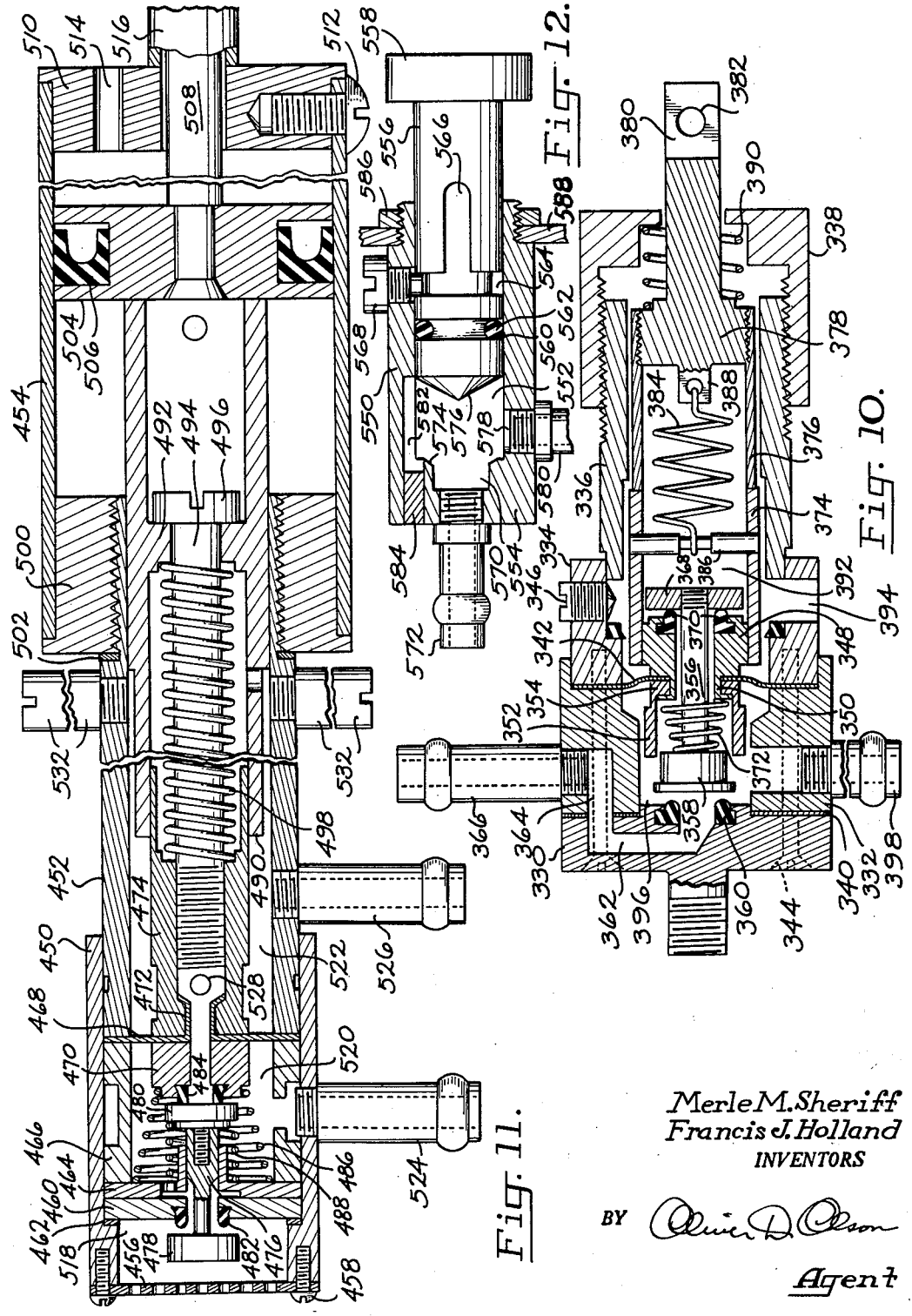

United States Patent Office 3,127,966
Patented Apr. 7, 1964

3,127,966
ACCELERATOR PEDAL CONTROLLED
BRAKE SYSTEM
Merle M. Sheriff, Minoa, N.Y., and Francis J. Holland,
753 James St., Syracuse, N.Y.; said Sheriff assignor to
said Holland
Filed Aug. 22, 1958, Ser. No. 756,664
32 Claims. (Cl. 192—3)

This invention pertains to brake systems for vehicles, and relates particularly to a full power brake system which may be controlled from the position of the conventional accelerator pedal of a vehicle.

So-called power brakes presently in use on vehicles are in reality power assist brakes, by virtue of the fact that a proportion of the fluid pressure applied to the wheel brakes is a direct contribution of leg power supplied by the driver. In most instances this proportion of power contributed by the driver is about one-third of the total, the remainder being supplied from a source of mechanical power.

Although this substantial reduction in leg power requirement has won public preference for power assist brakes over conventional brake systems, particularly for persons of slight build or strength, these power assist brakes as well as all other types presently available are characterized by a fundamental fallibility, namely their performance is dependent almost entirely upon the actions and reactions of the person using them. Accordingly, although their performance is adequate when the driver has ample time to plan his braking action, they are wholly inadequate under the critical condition of emergency when the driver must make an unplanned stop in the shortest possible distance.

The principal disadvantage inherent in all brake systems presently available, including power assist brakes, resides in the absence of control over the maximum fluid pressure supplied to the wheel brake. It has been determined that maximum braking is achieved when the wheels are braked just to the condition of impending skidding. That is to say, for any given speed of a vehicle, greater stopping distances result during skidding of the wheels than when the wheels are braked just to impending skidding. Of further importance in this regard is the fact that substantially greater control of the vehicle is maintained during a condition of impending skidding, than when the wheels are caused to skid.

It has been determined further, on the other hand, that under the panic conditions of unplanned emergency stops, the driver impulsively applies maximum leg power to the brake pedal. Accordingly, with conventional brakes operated by persons of average strength and with power assist operated by anyone, such emergency conditions for stopping consistently result in the application of excessive fluid pressure to the wheel brakes, with the consequent development of a skidding condition which lengthens the stopping distance and reduces driver control over the vehicle.

Still further, it has been determined that the condition of impending skidding and the fluid pressure required to attain it, varies with the physical condition of the roadway. Thus, for example, greater braking pressure is required for impending skidding on dry concrete pavement than on wet asphalt pavement and even less on icy pavement. No brake system presently available is adjustable to accommodate such variations in road conditions.

Another serious disadvantage inherent in all brake systems presently available, including power assist brakes, involves the significant amount of time required for a driver to transfer his foot from the accelerator pedal to the brake pedal. In this regard it is required that the driver first remove his foot from the accelerator pedal and then transfer his foot and leg to the displaced position of the brake pedal for applying the required pressure to the pedal. This transfer of the driver's foot and leg necessarily involves a considerable amount of time. For example, it has been determined that although persons of normal physical fitness and reflex react by reflex under emergency conditions to release pressure on the accelerator pedal almost instantly, still they require a time of approximately ¾ of one second to transfer the foot to the brake pedal. The significance of this time interval is more fully appreciated when it is realized that during this time the distance traveled by a vehicle is, for example, 33 feet at 30 miles per hour, and proportionately greater at higher speeds.

Although many attempts have been made heretofore to provide a brake system controlled from the position of the accelerator pedal, their failures have been characterized by faulty and non-reproducible operation, delayed action of response, general lack of "feel" at the driver's foot, and excessive cost of installation necessitated by the custom fitting of the mechanical parts which interconnect the accelerator pedal and the other components of the brake system.

Still another serious disadvantage in brake systems presently available resides in the fact that when a portion of a system is disabled, most infrequently by rupture of a wheel cylinder, the entire braking system is rendered inoperative.

It is a principal object of the present invention to provide a full power vehicle brake system operable from the position of the vehicle accelerator pedal, which system overcomes all of the aforementioned disadvantages of prior systems.

Another important object of this invention is the provision of an accelerator controlled full power vehicle brake system which affords control of maximum fluid pressure to the wheel brakes, whereby to eliminate the hazards normally attending impulsive overbraking by a driver.

A further important object of this invention is the provision of an accelerator controlled full power vehicle brake system which affords adjustment of the maximum fluid pressure supplied to the wheel brakes, whereby to achieve the condition of impending skidding under the various physical conditions of the road.

Still another important object of this invention is the provision of an accelerator controlled full power vehicle brake system which includes safety means by which the standard mechanical braking system of the vehicle may be resorted to in the event of failure of the vehicle engine.

A still further important object of the present invention is to provide accelerator controlled full power vehicle brake systems which includes safety means for preventing the total loss of braking in the event of failure of a portion of the brake system.

Still another important object of the present invention is to provide an accelerator controlled full power vehicle brake system which includes means by which to effect automatically the setting of the brakes, as for parking, when the vehicle engine is turned off.

A further important object of this invention is the provision of an accelerator controlled full power vehicle brake system which avoids costly custom assembly and installation.

Another important object of the present invention is the provision of an accelerator controlled full power vehicle brake system which is of relatively simplified construction for economical manufacture, is stable and efficient in operation, and requires a minimum of maintenance and repair.

The foregoing and other objects and advantages of this invention will appear from the following detailed description, wherein reference is made to the accompanying drawings in which:

FIG. 1 is a schematic view of an accelerator controlled full power brake system embodying features of the present invention, the assembly being arranged for operation on the air suspended principle;

FIG. 3 is a fragmentary central sectional view of a power unit embodying features of this invention and incorporated in the schematic diagrams of FIGS. 1 and 2;

FIG. 5 is a central longitudinal sectional view of a vacuum transducer valve embodying features of this invention and adapted for use in the brake system shown in FIG. 1;

FIG. 6 is a fragmentary central longitudinal sectional view showing a modification of a portion of the transducer valve of FIG. 5 adapted for solenoid operation;

FIG. 8 is a central longitudinal sectional view of a vacuum transducer valve embodying features of this invention and adapted for use in the brake system shown in FIG. 2;

FIG. 9 is a fragmentary central longitudinal sectional view showing a modification of a portion of the transducer valve of FIG. 8, adapted for solenoid operation;

FIG. 10 is a central longitudinal sectional view of a sensing valve embodying features of this invention and adapted for use in the brake system shown in FIG. 1;

FIG. 11 is a foreshortened central longitudinal sectional view of a sensing valve embodying features of this invention and adapted for use in the braking system of FIG. 2; and FIG. 12 is a central longitudinal sectional view of a switching valve embodying features of this invention and adapted for use in the brake systems of FIGS. 1 and 2.

Figure 2:
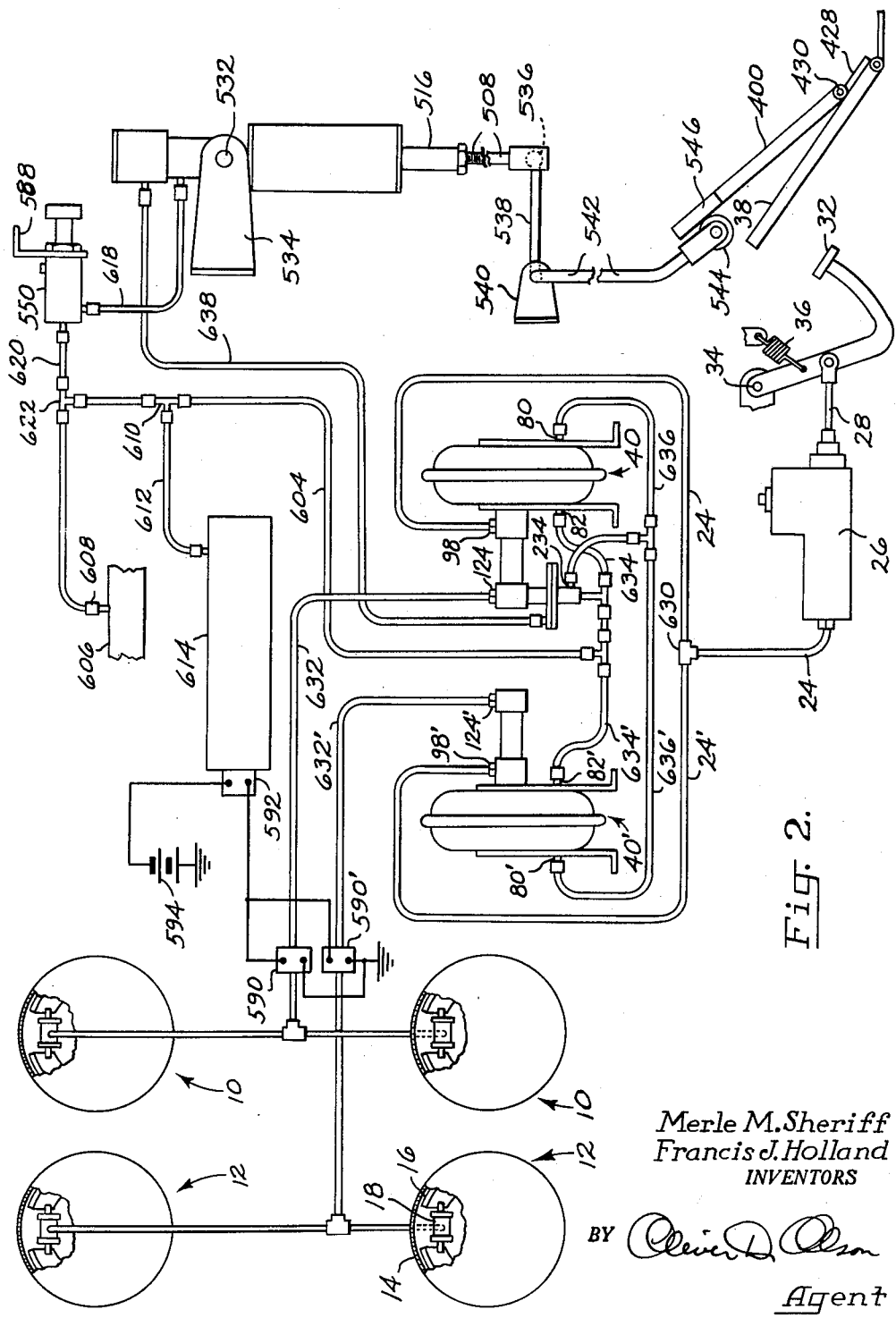
FIG. 2 is a schematic view similar to FIG. 1 but showing the brake assembly arranged for operation on the vacuum suspended principle.

Referring to FIG. 1 of the drawings, there is illustrated a conventional hydraulic brake system for the four wheels of a vehicle, there being a pair of front wheels 10 and a pair of rear wheels 12. Each wheel includes a brake drum 14 and cooperating brake shoes 16, the latter being powered by a hydraulic wheel cylinder 18. The wheel cylinders conventionally are supplied with hydraulic fluid through the conduits 20 connected to the common coupling 22. A conduit 24 normally interconnects this coupling and the output of a master hydraulic cylinder pump 26, the piston of which is connected through its piston rod 28 pivotally to the brake arm 30 of a brake pedal 32. The brake pedal is pivotally attached to the vehicle, as by means of pivot pin 34, and the pedal thereof is held resiliently in normally extended position by such means as the spring 36 which interconnects the brake arm and the vehicle. Thus, by depressing the brake pedal, the piston in the master cylinder pump is forced toward the outlet of the latter, thereby forcing hydraulic fluid into the wheel cylinders under pressure sufficient to expand the brake shoes against the brake drums.

In accordance with the present invention, the conventional brake system of the vehicle is retained in substantially the arrangement described, and a second brake system is incorporated therewith for operation and control from the position of the conventional accelerator pedal 38. This is afforded, in the embodiments illustrated, by the provision of an overlay pedal which, as explained in detail hereinafter, functions to control the operation of a sensing valve to provide a vacuum signal, the magnitude of which is proportional to the position of the overlay pedal in its range of movement. This vacuum signal, in turn, functions to control the operation of a transducer valve which meters, in proportion to the signal, a source of vacuum to a vacuum operated power unit. The latter then operates to supply a proportionate hydraulic fluid pressure to the wheel cylinders 18.

Thus, in each of the systems illustrated in FIGS. 1 and 2, vacuum is the motivating force for the brake system. The system illustrated in FIG. 1 operates on the air suspended principle, wherein the entire system is at atmospheric pressure when in normal rest condition, and the force is generated by evacuating one side of the system. In the vacuum suspended system illustrated in FIG. 2, the entire system is at inlet vacuum pressure when in normal rest condition, and the force is generated by introducing atmospheric air to one side of the system. Thus, both systems function by the development of a differential pressure between a substantially constant reference fluid pressure and a controlled variable fluid pressure on opposite sides of the systems.

*Power Unit*

Referring now to FIG. 3 of the drawings, the preferred form of vacuum-hydraulic power unit illustrated includes a diaphragm section 40 and a pump section 42. The diaphragm section comprises a hollow housing preferably constructed of two substantially identical half shells 44, 46. The adjacent peripheral edges of the shells each is formed with an outwardly projecting arcuate flange 48 and these flanges are held releasably in such adjacent position by means of the removably peripheral clamp 50. A supporting bracket 52 is secured to each shell, for purposes of mounting the power unit upon a vehicle.

The housing is divided into two internal chambers 54 and 56 by means of the resilient diaphragm 58 which is constructed of rubber or other suitable material preferably neoprene rubber. The outer periphery of the diaphragm is provided with an enlarged bead 56 adapted to seat between the adjacent arcuate flanges 48 of the shells and to be secured therebetween by the clamp 50.

The central portion of the diaphragm is reinforced by a substantially rigid backing. In the preferred embodiment illustrated, the diaphragm is provided with a central aperture which is closed by the pair of backing plates 62, 64. Each of these plates is provided with a peripheral groove 66 adjacent its outer edge, and these grooves cooperate to receive therebetween the enlarged inner peripheral bead 68 defining the central aperture of the diaphragm.

The backing plates are secured together by means of an elongated stem 70 which is provided at its rearward end with an externally threaded section 72 of reduced diameter. This threaded section extends through a central opening in the backing plates, and the latter are secured together between a backing washer 74 and a nut 76 threaded onto the section 72.

A tapped opening preferably is provided in the rear bracket and attached shell adjacent the rearward end of the stem, and an adjustment screw 78 is mounted in the tapped opening to provide an adjustable abutment for the stem 70. It is by this means that the normal rest position of the diaphragm may be established with accuracy.

Apertured nipples 80 and 82 are mounted on and project through the housing shells 44 and 46, respectively, and function to provide communication with the chambers 54 and 56, as explained more fully hereinafter.

The diaphragm is urged rearwardly to its normal rest position by means of the helical spring 84 which encircles the stem 70 and abuts at its opposite ends against the backing plate 64 and the shell 46.

The pump section 42 includes a hollow cylinder 86 which is threaded externally at one end to receive the internally threaded end of the hollow inlet adapter 88. An airtight seal is provided between these elements by the sealing ring 90. The opposite end of the adapter is reduced in diameter for reception through a central opening in the front bracket and shell 46, and is externally threaded for reception of the securing nut 92. An airtight seal is provided between the adapter and the shell by means of the sealing ring 94.

A lateral threaded opening 96 is provided in the adapter for connection of a conduit fitting 98 which supplies hydraulic fluid under pressure. This opening is so arranged as to communicate with the rearward end of the cylinder 86.

The forward end of the stem 70 extends freely into the bore of the inlet adapter, and an airtight seal is provided between the stem and adapter by means of the sealing ring 100.

Mounted freely within the bore 102 of the hollow cylinder adjacent the inlet adapter end, is a shuttle valve 104 provided with a rearwardly projecting check seal 106 and a forwardly projecting cup seal 108. At its rearward limit of movement, the irregular contoured edge of the shuttle valve abuts the shoulder 110 formed in the adapter between the bore carrying the seal 100 and the enlarged internally threaded section. In this rearward position the cup seal 108 still is positioned forwardly of the rear end of the cylinder and hence is interposed between the cylinder and the inlet opening 96 for hydraulic fluid. In the embodiment illustrated, the shuttle valve is urged normally to this limit of rearward movement by means of the spring 112 which is interposed between the forward end of the shuttle valve and an adjustable cap 114 mounted on a threaded extension 116 of the stem 70. The extension projects freely through a central longitudinal bore in the shuttle valve. As will be explained more fully hereinafter, forward movement of the shuttle valve through the cylinder bore 102 results when the check seal 106 is engaged by the stem 70 during forward movement of the latter.

The outlet end of the cylinder 86 is threaded externally for reception of the internally threaded end of the outlet adapter 118, an airtight seal being provided between these elements by means of the sealing ring 120. A threaded outlet opening 122 connects an outlet conduit fitting 124 and communicates with the internally threaded section of the outlet adapter. This outlet opening is releasably sealed by means of a check valve which functions to restrict counterflow of hydraulic fluid to the limited extent necessary to prevent drawing air into the system in the event of failure of the line or wheel cylinders. In the embodiment illustrated, the check valve is of the conventional dome type and comprises a hollow dome 126 having a flanged open end which is held resiliently against the sealing ring 128 by means of the helical spring 130 interposed between the dome flange and the terminal end of the cylinder 86. The closed end of the dome is provided with a plurality of perforations 132 which are releasably closed by a resilient seal 134 contained within the dome and supported by the backing disc 136.

An auxiliary threaded outlet 138 is provided in the outlet adapter 118 on the cylinder bore side of the cup seal for interconnecting the cylinder bore and a conduit fitting 140. The auxiliary outlet functions in a manner explained more fully hereinafter.

It will be apparent that the springs 112 and 130 may be replaced by a single spring which extends the full length of the cylinder and abuts at its opposite ends against the forward end of the shuttle valve 104 and the flange of the check valve dome 126. In such case the cap 114 and the threaded extension 116 of the stem may be eliminated.

In operation, the power unit functions by the development of the differential pressure across the diaphragm 58 to force the latter and the attached stem toward the left, against the compression of spring 84. The differential pressure may be developed in various ways and by various means, to provide a greater fluid pressure in the chamber 54 than in the chamber 56. One method is to expose the chamber 54 to the atmosphere, as a reference fluid pressure, and to apply a controlled variable source of vacuum to the chamber 56. Alternatively, the chamber 56 may be connected to a substantially constant source of vacuum, as a reference fluid pressure, and the chamber 54 connected to a controlled variable source of vacuum the magnitude of which is less than that of the reference pressure, i.e., toward or above atmospheric pressure.

The bore 102 of the cylinder 86 is filled with a fluid, for example hydraulic fluid, as from a source admitted through the opening 96. The main outlet opening 122 is connected to a closed system to be operated by the hydraulic fluid, and the auxiliary outlet 138 either is capped or connected to a closed system to be operated by the hydraulic fluid.

A particularly important feature of the power unit described herein, resides in the arrangement by which the check seal 106 on the shuttle valve is displaced from the adjacent end of the stem 70 when the system is at rest. Thus, with the fluid pressure inlet 96 positioned to communicate with the space between the check seal 106 and the adjacent end of the stem when the system is at rest, hydraulic fluid under pressure may be admitted into said space and through the hollow shuttle valve to pressurize the system connected to the cylinder outlet, without the assistance of the diaphragm assembly.

Of equal importance, on the other hand, is the fact that when the stem 70 is forced toward the outlet end of the cylinder 86, by the development of differential pressure across the diaphragm 58, it is brought into sealing engagement with the check seal 106, isolating the hydraulic system on the outlet side of the shuttle valve from the hydraulic pressure at the inlet 96. Accordingly, the increased hydraulic pressure developed on the outlet side of the shuttle valve as it is moved toward the outlet end by the stem, cannot get through the sealed shuttle valve to be impressed upon the hydraulic fluid pressure system connected to inlet 96.

However, when the stem reaches its limit of movement toward the outlet end of the cylinder, as determined by the magnitude of differential fluid pressure across the diaphragm, additional fluid pressure may be developed in the outlet system by introducing through the inlet 96 hydraulic fluid pressure of sufficient magnitude to force the shuttle valve check seal 106 forwardly, out of sealing engagement with the stem.

*Transducer Valve Air Suspended Principle*

Figure 4:
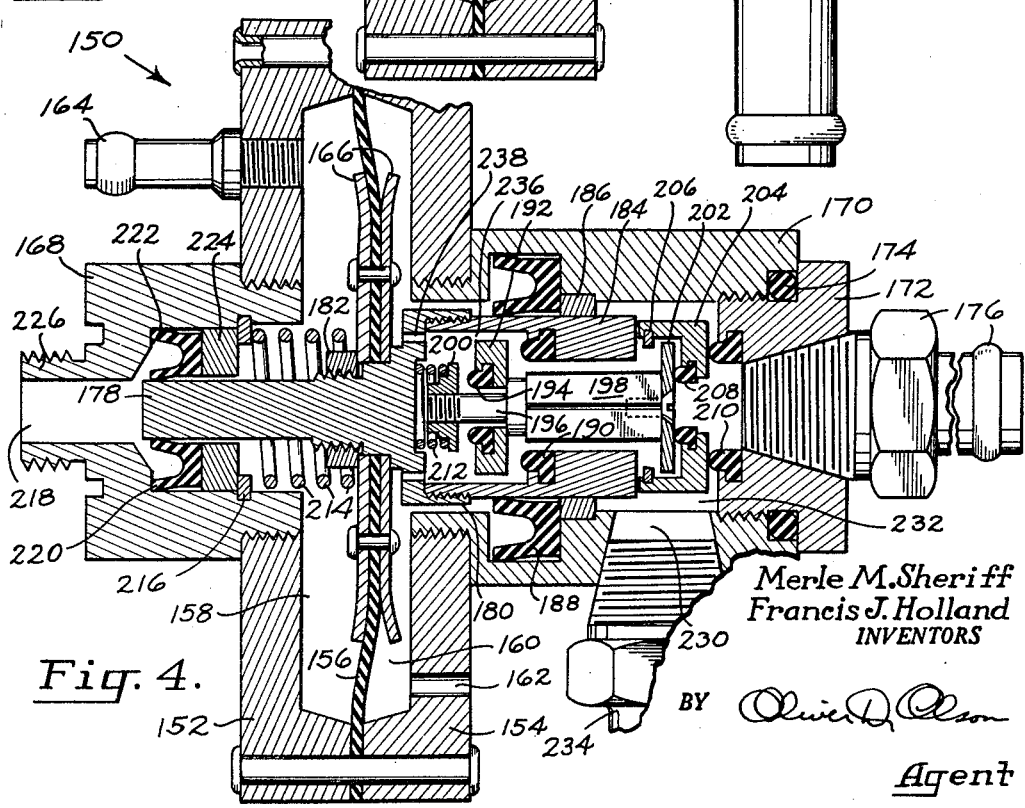
FIG. 4 is a central longitudinal sectional view of a vacuum-hydraulic transducer valve embodying features of this invention and adapted for use in the brake system shown in FIG. 1.

Referring now to FIG. 4 of the drawings, there is shown a hydraulic pressure control transducer valve adapted for use in the brake system shown in FIG. 1 and operable on the air suspended principle. The valve includes the intermediate hollow diaphragm section 150 formed of substantially identical hollow shells 152 and 154 secured together adjacent their peripheries by such means as the rivets illustrated. Secured between the shells is the resilient diaphragm 156 which functions to divide the diaphragm sections and to a reference fluid pressure chamber 158 and a controlled variable fluid pressure chamber 160. In the embodiment illustrated, one or more openings 162 are provided in the housing shell 154 for communicating the chamber 160 with the atmosphere, as a reference fluid pressure. A lateral tapped opening in the housing shell 152 receives the hollow hose fitting 164 which functions to communicate the chamber 158 with a source of variable fluid pressure, which functions as a signal pressure, as explained more fully hereinafter.

The diaphragm 156 is constructed of rubber or other suitable material, preferably neoprene rubber, and is apertured centrally and reinforced on its opposite sides by the backing plates 166 which are secured together by such means as the rivets illustrated.

The housing shells are apertured centrally and tapped for connection of the hollow end sections 168 and 170. The exposed end of the section 170 is threaded internally to receive the closure 172, an air tight seal being formed therebetween by the sealing ring 174. The closure 172 is provided with a central tapped bore for connection of the hose fitting 176.

A stem 178 extends through the central opening provided in the assembly of the diaphragm and backing plates, and is secured to the latter by abutment of the enlarged stem head 180 and the securing nut 182. An annular threaded shoulder on the head functions to connect the head extension 184. The head extension is guided for reciprocation by a bushing 186 mounted in an annular groove in the section 170 and held in place by the resilient cup seal 188 confined within an adjacent annular groove.

The head extension 184 is provided intermediate its ends with an internal annular valve seal 190. Mounted within the head extension between the seal and the stem head, is a secondary valve seat 192. This seat is provided with a central opening defined in part by the annular check seal 194 which projects from the side of the valve seat 192 opposite the side which faces the seal 190. The reduced end 196 of a valve stem 198 projects freely through the opening in the valve seat 192 and is threaded at its outer end to receive the pilot valve seat 200. Sufficient space is provided between the pilot valve seat and the shoulder on the valve stem to permit limited longitudinal movement of the secondary valve seat 192 therebetween.

The enlarged section of the valve stem 198 extends freely through the central opening in the head extension 184, and is of triangular or other noncircular cross section to provide a space between the stem and opening. The terminal end of the valve stem supports a pilot valve seat 202, secured thereto as by means of the screw illustrated. A secondary valve seat 204 freely encircles the pilot valve seat for relative longitudinal movement between the snap ring 206 and the check seal 208 surrounding the central opening in the secondary valve seat. The secondary valve seat is arranged for releasable abutment against the annular check seal 210 surrounding the opening in the end closure 172.

A spring 212 is interposed between the stem head 180 and the pilot valve seat 200 to resiliently urge the valve stem 198 toward the right, to close the valve seats 202 and 204 against their respective check seals. A second spring 214 is interposed between the side of the diaphragm opposite the valve head 180 and a snap ring 216 supported in an annular groove in the end section 168. This spring functions to urge the stem and head extension resiliently toward the right to maintain the valve seats 192 and 200 separated from their respective check seals, in the normal rest condition of the valve assembly.

The stem 178 projects freely into the longitudinal end bore 218 in the end section 168. This bore is sealed from the diaphragm chamber 158 by means of the cup seal 220 which encircles the stem and is confined in the end section between the shoulder 222 and guide collar 224, the latter being backed by the snap ring 216. The terminal end 226 of the section 168 is threaded externally for connection to the tapped auxiliary outlet of the power unit pump section, for purposes explained in detail hereinafter.

The end section 170 is provided with a lateral tapped opening 230 which communicates with the controlled vacuum chamber 232 formed between the sealing ring 174 and the cup seal 188. A hose fitting 234 is secured in the opening 230. An air chamber 236 formed within the hollow stem extension, communicates with the air chamber 160 of the diaphragm section, by means of one or more openings 238 provided in the stem head. A vacuum signal chamber is formed between the cup seal 220 and the diaphragm 156, and communicates with the hose fitting 164.

Referring now to FIG. 5 of the drawings, there is shown a vacuum controlled transducer valve adapted for use in the brake system shown in FIG. 1 and operable on the air suspended principle. This valve is similar in construction to the valve of FIG. 4, with the following exceptions: The cup seal 188 and air openings 162, 238 of FIG. 4 are omitted, and the solid stem 178 of FIG. 4 is replaced with a hollow stem providing the bore 240 which communicates with the air chamber 236. The terminal end of the section 168 in FIG. 5 also is modified by terminating the end bore 218 within the section 168, the externally threaded terminal end 226 being solid, rather than hollow as in FIG. 4. The bore 218 communicates with the atmosphere by means of the lateral bore 242 which communicates at its outer end with the annular groove 244 formed in the end section 168.

By the foregoing arrangement there is provided a controlled vacuum chamber 246 formed between the sealing ring 174 and the diaphragm 156. The vacuum signal chamber 158 is formed between the cup seal 220 and the diaphragm 156, as in FIG. 4. An air chamber 248 is formed by the hollow stem 178 and head extension 184, between the valve seal 190 and the opening 242 which communicates with the atmosphere.

Referring now to FIG. 6 of the drawings, the solenoid controlled transducer valve shown therein is substantially identical to the valve shown in FIG. 5, with the following exceptions: The closed end of the section 168 is eliminated, the hollow stem 178 extended in length and the end section 168 designed to receive therein the hollow solenoid coil 250 through which the stem extends. The solenoid coil is confined within the end section between the shoulder 252 and snap ring 254, and the hollow stem is provided with a hollow section of soft iron 256 which functions as the armature of the coil. The soft iron section is arranged in relation to the coil in such manner that energization of the latter induces longitudinal movement of the stem toward the left.

The electric circuit of the solenoid coil includes the series arrangement of the vehicle battery 258, the variable resistance element 260 and the movable contact 262 associated therewith. In the embodiment illustrated, the resistance element is housed in an elongated tube 264 which is supported pivotally at its base end, by means of pivot pin 266, on a bracket 268 secured to the vehicle. The contact 262 is carried by a plunger 270 which, in the embodiment illustrated, is secured pivotally at one end to the overlay pedal 272, as by means of the pivot pin 274. The overlay pedal is attached pivotally through pivot pin 276 to a base section 278 which is secured to the main accelerator pedal 38 of the vehicle, by bolts or other suitable means.

Thus, as the overlay pedal is moved arcuately through its range, the contact 262 moves along the resistance element to vary the potential supplied to the solenoid 250. This variable potential at the solenoid is reflected in a proportionate longitudinal force applied to the hollow stem 178.

The limit of movement of the stem assembly may be controlled over a variable range by limiting the movement of the contact 262 along the resistance element. This is accomplished in the embodiment illustrated by providing an internally threaded sleeve 280 over the tube 264, and an enlarged shoulder 282 on the plunger 270 between the tube and the closed outer end 284 of the sleeve. Thus, the limit of outward movement of the plunger is established by abutment of the shoulder against the closed end of the sleeve, this limit of extension being controlled by longitudinal adjustment of the sleeve with respect to the tube.

*Transducer Valve Vacuum Suspended Principle*

Figure 7:
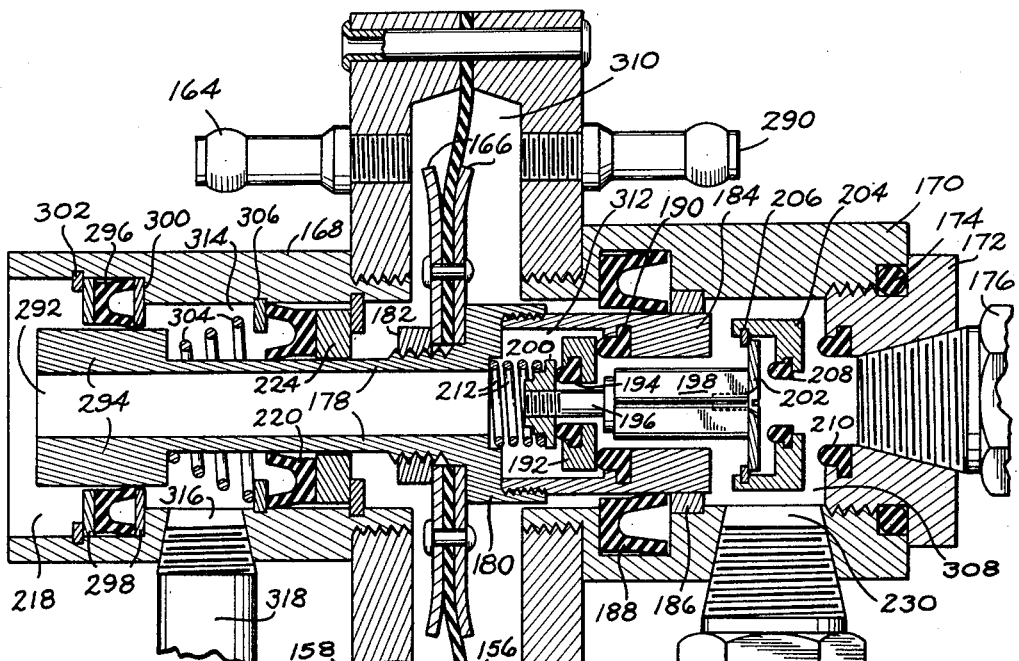
FIG. 7 is a central longitudinal sectional view of a vacuum-hydraulic transducer valve embodying features of this invention and adapted for use in the brake system shown in FIG. 2.

Referring now to FIG. 7 of the drawings, there is shown a modification of the hydraulic pressure controlled transducer valve on FIG. 4, adapted for use in the brake system shown in FIG. 2 and operating on the vacuum suspended principle. This valve is similar in construction to the valve of FIG. 4, with the following exceptions: The air opening 238 in the stem head of FIG. 4 is omitted, and the air opening 162 in the housing shell 160 of FIG. 4 is replaced by a tapped opening supporting the hose coupling 290. The solid stem 178 of FIG. 4 is replaced by a hollow stem, thus providing a bore 292 which communicates the air chamber 312 with the atmosphere. The hollow stem is provided at its outer end with an enlarged piston 294, the end bore 218 of the end section 168 being enlarged to accommodate it. A cup seal 296 forms a seal between the piston and bore, and is confined between spaced washers 298 which abut the shoulder 300 and snap ring 302 in the end section. The spring 214 of FIG. 4 is replaced by a conical compression spring 304, preferably interposed between the piston 294 and the snap ring 306 which replaces the shoulder 222 of FIG. 4 for confining the cup seal 220.

By the foregoing arrangement, there is provided in the transducer valve a controlled vacuum chamber 308 formed between the ring seal 174 and cup seal 188, a vacuum source chamber 310 between the cup seal 188 and diaphragm 156, an air chamber 312 between the secondary valve seal 190 and the atmosphere, through the stem bore 292, a vacuum signal chamber 158 as in FIG. 4, and a hydraulic pressure balancing chamber 314 formed between the cup seals 220 and 296. This latter chamber communicates with a lateral tapped opening 316 in the end section 168, the opening supporting a conduit fitting 318 for connection to the auxiliary outlet opening of the power unit pump.

The arrangement is such that, in normal rest condition of the transducer valve, the air valve seats 200 and 192 are closed against their respective check seals and the vacuum valve seats are displaced from their respective check seals.

Referring now to FIG. 8 of the drawings, there is shown a modification of the vacuum controlled transducer valve of FIG. 5, adapted for use in the brake system shown in FIG. 2 and operating on the vacuum suspension principle. The valve assembly is substantially identical to the valve assembly shown in FIG. 5 with the following exceptions: The spring 214 shown in FIG. 5 is eliminated and a spring 320 is provided to encircle the stem head extension 184 and to abut at its opposite ends against the bushing 186 and the stem head 180, respectively. Thus, whereas in the valve assembly shown in FIG. 5 the valve seats 192 and 200 are spaced apart from their respective check seals and the valve seats 202 and 204 are closed against their respective seals, when the system is at rest, this arrangement of valve seats is reversed in FIG. 8.

Referring now to FIG. 9 of the drawings, the solenoid controlled transducer valve shown therein is substantially identical to the valve shown in FIG. 8, with the exception that the closed end of the section 168 is modified as in FIG. 6 to include the solenoid coil 250. The soft iron section 256 of the hollow stem is so arranged in relation to the coil that energization of the latter induces longitudinal movement of the stem toward the right.

Sensing Valve Air Suspended Principle

Referring now to FIG. 10, there is shown a sensing valve adapted for use in the brake system shown in FIG. 1 and operable on the air suspension principle to provide an output vacuum signal, the magnitude of which is a function of the relative position of a rod or stem from a reference position.

The sensing valve is embodied in a hollow housing formed by the assembly of the mounting cap 330, the head 332, the sleeve 334, the barrel 336 and the adjustment cap 338. A sealing gasket 340 is provided between the mounting cap and head, and a resilient diaphragm 342 is interposed between the head and sleeve, after which these elements are secured together by means of the screws 344 which are anchored in the sleeve. The barrel is secured at one end to the sleeve by such means as the screw 346, and the opposite end of the barrel is threaded externally for mounting of the adjustment cap 338.

The hollow stem section 348 is positioned on the forward side of the diaphragm and the central hub 350 thereof projects through a central opening in the diaphragm. The hollow stem section 352 is positioned on the rearward side of the diaphragm and the internally shouldered end 354 thereof is received over the hub, after which the latter is swaged over to secure the stem sections together, with the diaphragm sealed therebetween.

A valve pin 356 extends through the hollow stem sections and is provided at its rearward end with an enlarged valve seat 358 which is arranged for releasable sealing engagement with the resilient check seal 360. This seal is carried by the mounting cap 330 and defines the inner end of the vacuum source chamber 362. This chamber is connected through the port 364 to a lateral tapped opening in the head 332, in which is secured the hose fitting 366 for connection to a source of vacuum.

The forward end of the valve pin 356 projects through the forward sleeve section 348 and is threaded for attachment of the valve seat 368. This valve seat is arranged for releasable sealing engagement with the resilient check seal 370 mounted in the stem section 348 about the central opening therein.

A compression spring 372 surrounds the valve pin and abuts at its opposite ends against the valve seat 358 and the shoulder 354 of the stem section 352, respectively, whereby to urge the seat resiliently toward the left into sealing engagement with the check seal 360.

A hollow stem extension 374 is secured to the forward stem section 348, as by means of a press fit, and projects forwardly therefrom into the barrel 336. Mounted freely in the forward end of the barrel for sliding movement therein is a hollow spring guide 376, the forward end of which is threaded internally for mounting the inner enlarged end 378 of the elongated actuating rod 380. This rod projects outwardly through a central opening in the adjustment cap 338, and is provided at its outer end with means, such as the opening 382 for connection to the actuating assembly associated with the vehicle accelerator pedal, as explained more fully hereinafter.

A tension spring 384 interconnects the stem extension 374 and the spring guide 376, being secured at one end to a transverse pin 386 mounted in the stem extension, and at the opposite end to a projection 388 on the actuating rod head 378. Thus, the spring functions to urge the stem assembly toward the right in response to outward extension of the actuating rod 380. The actuating rod and its attached spring guide is urged resiliently toward the stem assembly, by the action of the compression spring 390 which encircles the inner end of the actuating rod and abuts at its opposite ends against the adjustment cap 338 and actuating rod head 378, respectively. This spring functions during acceleration of the vehicle to separate the valve seat 368 from its seal 370, thereby venting the brake system to the atmosphere and maintaining the brakes in released condition.

By the foregoing arrangement of parts, there is provided in the sensing valve an air chamber 392 defined in part by the valve seat seal 370 and which communicates with the atmosphere through the one or more lateral openings 394 or through the central opening in the adjustment cap, or both. A controlled vacuum chamber 396 is defined between the valve seat seal 360 and the left side of the diaphragm 342, and this chamber communicates with a lateral tapped opening in the head 332 which mounts a hose fitting 398 for connection to a vacuum-operated device to be controlled.

The sensing valve is arranged for connection to and operation by an overlay pedal 400 (FIG. 1) mounted upon the conventional accelerator pedal 38 of a vehicle. To this end there is provided a supported bracket 402 adapted to be mounted on the fire wall of the vehicle body adjacent and above the accelerator pedal. An outwardly projecting top flange 404 on the bracket is provided with an opening through which to receive the threaded extension on the mounting cap 330 of the sensing valve, said extension receiving a nut 406 for securing the valve to the flange.

The opening 382 in the depending end of the actuator rod 380 receives a pivot pin 408 therethrough for connection to one end of a link 410, the opposite end of which is connected to the pivot pin 412 extending between the spaced arms 414 of a U-shaped bell crank member. A second pivot pin 416 projects through the bell crank member a spaced distance from the pivot pin 412, for pivotal mounting at its opposite ends on the spaced lower flanges 418 projecting from the bracket 402. A connecting rod 420 is mounted pivotally and somewhat loosely at one end on the pivot pin 416, and extends downwardly therefrom. The lower end of the rod is received slidably within the bore of an elongated tube 422, the lower end of which is connected pivotally, as by a ball and socket assembly 424, to a lateral tab 426 on the overlay pedal.

The rearward end of the overlay pedal is connected pivotally to a base plate 428, as by means of a hinge pin 430. The plate is mounted directly upon the upper surface of the conventional accelerator pedal 38 and secured thereto as by means of the bolts illustrated.

The overlay pedal is supported normally in a retracted position, a spaced distance away from the accelerator pedal, to provide a range of movement for the braking operation. In the embodiment illustrated, this position of retraction is provided by a coil spring 432, which is secured at one end to a tab 434 projecting laterally from the overlay pedal adjacent the rearward end of the latter, and at the opposite end to a tab 436 projecting laterally from a clip 438 secured to the forward end of the accelerator pedal, as by means of the screw illustrated.

An adjustment screw 440 is mounted in a threaded opening in the closed section 442 of the bell crank member, for abutment by the connecting rod 420. This screw is adjustable to the position at which it is engaged by the rod when the overlay pedal is pivoted from its normal position of retraction to the position at which it just engages the accelerator pedal. This is the idle position of the accelerator and the brake releasing position of the overlay pedal. If desired, the screw may be backed off slightly to provide a small neutral zone between the idle position of the accelerator pedal and the beginning of the braking zone of the overlay pedal.

With the overlay pedal pivoted counterclockwise to the position in which it just engages the accelerator pedal, further counterclockwise movement of the two pedals in unison, functions merely to move the accelerator pedal through the acceleration zone, with the rod 420 pivoting in the clockwise direction freely about the pivot pin 416. However, when the overlay pedal is pivoted in the clockwise direction after the accelerator pedal has been returned to its idle position, the rod 420 is caused to engage the adjustment screw 440 and cause counterclockwise rotation of the bell crank member about the pivot pin 416. This rotation of the bell crank member results in downward movement of the pivot pin 412 and simultaneous extension of the actuating rod 380 of the sensing valve.

It is to be noted that the lose pivotal connection of the rod 420 on the piovt pin 416, and the telescoping arrangement of the rod 420 and tube 422, affords a substantial latitude in misalignment between the overlay pedal and the sensing valve. Further, the arrangement is such as to prevent pedal hangup due to the floor mats or rugs, or to dirt, snow or other debris which might accumulate in the area adjacent the accelerator pedal.

*Sensing Valve Vacuum Operated Principle*

Referring now to FIG. 11 on the drawings there is shown a modified form of sensing valve, adapted for use in the brake system of FIG. 2 and operable on the vacuum suspended principle. This valve is embodied in a hollow housing formed by the head 450, the barrel 452 and the loading cylinder 454. The outer end of the head is provided with an air filter cap 456, secured to the head as by means of the screws 458. A centrally apertured transverse partition 460 is mounted in the head, an air tight seal therebetween being provided by the gasket 462. A centrally apertured valve guide 464 is positioned adjacent the partition and is held in place by the spacer sleeve 466. A resilient diaphragm 468 is placed against the spacer sleeve and the barrel 452 is then pressed or otherwise secured in the head, in sealing abutment with the diaphragm.

A hollow stem section 470 is provided with a projecting hub 472 which extends through a central opening in the diaphragm 468. A second hollow stem section 474, located on the opposite side of the diaphragm, is received onto the projecting hub, after which the latter is swaged over to secure the stem sections together with the diaphragm sealed therebetween.

A valve pin 476, preferably formed of two sections secured firmly together as by means of a press fit or interengaging threads, projects freely through the central openings in the transverse partition and valve guide, and is provided at its opposite ends with enlarged valve seats 478 and 480. The valve seat 478 is arranged for releasable sealing engagement with the annular check seal 482 mounted in the partition 460 and surrounding the central opening therein. The valve seat 480 is arranged for releasable sealing engagement with the annular check seal 484 mounted in the stem section 470 and surrounding the central opening therein.

A compression spring 486 abuts at its opposite ends against the valve guide 464 and stem section 470 and functions to urge the latter to the right, to unseal the valve seat 480 and check seal 484, and a second spring 488 abuts at its opposite ends against the valve guide 464 and the valve seat 480 to maintain the valve seat 478 in resilient sealing engagement with the check seal 482.

A hollow stem extension 490 is mounted slidably upon the stem section 474 for longitudinal movement relative thereto, and is provided with an internal shoulder 492. An elongated slide bolt 494 is secured at one end to the stem section 474, as by means of the interengaging threads illustrated, and projects through the restricted opening in the slide extension formed by the internal shoulder. An enlarged head 496 is provided on this projecting end of the slide bolt for abutment by the internal shoulder of the stem extension. An elongated spring 498 encircles the slide bolt and abuts at its opposite ends against the stem section 474 and the internal shoulder 492, respectively, to urge the stem extension 490 toward the right, to the limit at which the internal shoulder abuts the slide bolt head.

The outer end of the barrel 452 is threaded externally for connection of the loading cylinder cap 500, an air tight seal being provided therebetween by means of the gasket 502. Mounted slidably within the loading cylinder is a piston 504, provided with an annular groove for retaining the cup seal 506. An elongated piston rod 508 projects from the piston through the centrally apertured cylinder plug 510 which is secured to the cylinder as by means of the screws 512. This plug is provided with one or more openings 514 therethrough to permit the passage of air into and out of the space behind the piston. The projecting end of the piston rod is threaded externally for reception of the adjustment nut 516 which functions, by abutment with the cylinder plug 510, to limit the inward movement of the piston and hence the output of the sensing valve as explained more fully hereinafter.

The foregoing arrangement of parts provides in the sensing valve an air chamber 518 between the transverse partition 460 and the filter cap 456, a controlled vacuum chamber 520 between the partition and the diaphragm 468, and the vacuum source chamber 522 between the diaphragm and the loading cylinder piston 504. A lateral tapped opening in the valve head 450 and barrel 452 communicates with the controlled vacuum chamber 520 and supports a hose fitting 524 for connection to a vacuum-operated device to be controlled. A lateral tapped opening is provided in the barrel 452 for communication with the vacuum source chamber 522, and supports the hose fitting 526 for connection to a source of vacuum. One or more lateral openings 528 is provided in the stem section 474 to interconnect the vacuum source chamber 522 and the hollow interior of the stem sections, whereby to interconnect the vacuum source chamber and the control vacuum chamber 520 when the valve seat 480 is unsealed from its check seal 484.

The sensing valve of FIG. 11 also is arranged for connection to and operation by the overlay pedal 400 (FIG. 2) mounted upon the conventional accelerator pedal 38. Thus, there is provided a substantially U-shaped bracket 530 adapted to be secured to the fire wall of a vehicle body adjacent and above the accelerator pedal. The sensing valve is provided with a pair of diametrically opposed projecting pins 532 for support in aligned openings in the spaced arms 534 of the bracket, for pivotally mounting a sensing valve.

The terminal end of the projecting piston rod 508 is connected pivotally as by means of the ball and socket assembly 536, to the projecting arm 538 of a bell crank lever which is mounted pivotally in a second U-shaped bracket 540 secured to the fire wall of the vehicle body. The second arm 542 of the bell crank member projects downwardly from the bracket and is provided at its end with a roller 544 positioned for engaging the underside of a laterally extending section 546 of the overlay pedal 400.

Since the sensing valve is self loading, i.e., the piston rod 508 is fully retracted into the loading cylinder 454 by virtue of the vacuum source being impressed upon the piston 504, the bell crank member 538, 542 normally is maintained as its extreme position of counterclockwise rotation. Accordingly, the overlay pedal normally is held in its position of retraction from the accelerator pedal, as illustrated, without the assistance of a spring system such as is employed in the pedal assembly shown in FIG. 1.

*Switching Valve*

Referring now to FIG. 12 of the drawings, the switching valve comprises a hollow body 550 defining the longitudinal bore 552 which terminates adjacent the closed end 554 of the body. Mounted slidably within the bore is a control shaft 556, the outer end of which is provided with an enlarged knob 558. The control shaft is provided with an annular groove 560 adjacent its inner end, and this groove receives the annular sealing ring 562 by which to form an airtight seal between the shaft and the bore.

A second annular groove 564 is provided in the control shaft outwardly from the first mentioned groove, and this groove communicates with a longitudinal groove 566 which extends toward the knob end. A guide pin 568 is mounted removably in the body, with its inner end projecting into the bore for reception within the grooves 564 and 566 formed in the control shaft.

The closed end of the body is provided with a tapped opening 570, concentric with the control shaft, for mounting of the hose fitting 572. The inner end of the tapped opening is formed with a valve seat 574 adapted to receive the forward end 576 of the control shaft in sealing engagement therewith, when the control shaft is moved with the bore to its forward extended position of adjustment. A second tapped opening 578 is provided in the body adjacent the closed end thereof, for mounting the hose fitting 580.

A groove 582 is provided in the body adjacent the closed end thereof and communicating with the longitudinal bore 552. In the embodiment illustrated, this groove is provided conveniently by drilling through the closed end of the body adjacent and parallel to the longitudinal bore, and then sealing the closed end with the plug 584.

One end of the body is threaded externally for reception of the securing nut 586 by which the switching valve may be mounted upon a support, such as the bracket 558 illustrated in FIGS. 1 and 2.

In the retracted position of the control shaft illustrated in FIG. 12, wherein the pin 568 is engaged in the annular groove 564, the forward end 576 of the control shaft is removed from the seat 574. Accordingly, the forward end of the bore 552 functions to interconnect the vacuum source opening 570 and the vacuum outlet opening 578, and the annular seal 562 prevents the leakage of air into the system.

When it is desired to disconnect the vacuum source from the vacuum outlet, the control knob 558 is rotated until the longitudinal groove 566 aligns with the pin 568, whereupon the vacuum in the bore ahead of the control shaft pulls the latter forward into sealing engagement with the valve seat 574. In this position of adjustment of the control shaft, the vacuum source opening 570 is sealed from the vacuum outlet 578. Further, the annular sealing ring 562 is positioned forwardly of the rearward end of the longitudinal groove 582, thereby permitting air to leak in through the space between the control shaft and bore and into the vacuum outlet, thereby relieving the vacuum pressure in the outlet system.

*Automatic Parking Brake*

Referring now to FIGS. 1 and 2 of the drawings, there is shown as another feature of the present invention an automatic parking brake associated with the brake systems. In each of these arrangements, a solenoid operated check valve 590 is inserted in the hydraulic fluid line leading from the power unit pump outlet to the wheel cylinders 18, and a vacuum pressure switch 592 is inserted in the vacuum supply system. The vacuum pressure switch is normally open when the vacuum pressure reacting on it exceeds an adjustable predetermined value, and is closed when the vacuum pressure is reduced to the predetermined amount. The switch is included in a series electric circuit which includes the solenoid operated check valve and the vehicle battery 594. Thus, when the vacuum pressure switch is closed, it completes the circuit of the check valve to close the hydraulic fluid line leading back from the wheel cylinders to the power unit pump section.

When the vehicle engine is started and the vacuum system builds up to its maximum, the vacuum switch is opened, thereby deenergizing the solenoid operated check valve and permitting maximum hydraulic pressure to flow to the wheel cylinders. Since the accelerator pedal controlled brake system described herein functions to supply maximum hydraulic pressure to the wheel brakes when the accelerator pedal and the overlay pedal are fully retracted, it will be understood that maximum braking pressure is supplied to the wheel cylinders when the foot of the driver is completely removed from the accelerator pedal. Such a condition prevails, for example, just prior to shutting down the vehicle engine preparatory to parking. Thus, when the vehicle engine is turned off and the vacuum in the system gradually decreases, the vacuum switch is caused to close when the vacuum pressure reaches a predetermined lower value, at which time the solenoid operated check valve is caused to close, thereby sealing the hydraulic line against further reduction of hydraulic pressure at the wheel cylinders. This amount of hydraulic pressure is chosen to be sufficient to maintain the wheel brakes set.

*System Assembly and Operation Air Suspended Principle*

Referring to FIG. 1 of the drawings, the hydraulic line 24 normally interconnecting the master cylinder pump 26 and the wheel cylinders 18 is arranged to interconnect the output of the master cylinder pump and the hydraulic inlet opening 96 in the power unit pump section 42. The main hydraulic outlet opening 122 in the power unit pump section is connected through the conduit 600 and, if desired, the solenoid operated check valve 590, to the distributor coupling 22 of the hydraulic brake lines 20.

When the hydraulic controlled transducer valve of FIG. 4 is employed, it may be mounted directly upon the power unit pump section, at the auxiliary outlet 138 of the latter, as explained hereinbefore, for connecting the output of the power unit pump section to the transducer valve. When the vacuum controlled transducer valve of FIG. 5 is employed in the system of FIG. 1, it is conveniently supported by the power unit pump section by threading the end plug 226 into the auxiliary outlet.

The opening 230 (FIGS. 4 and 5) in the transducer valve communicating with the controlled vacuum chamber is connected through hose 602 to the vacuum chamber 56 of the power unit diaphragm section, and the hose fitting 176 on the transducer valve is connected through the hose 604 to the intake manifold of the vehicle engine, it being understood that the intake manifold 606 provides the source of vacuum for the power brake system. A check valve 608 is included in the connection of the hose and manifold to prevent loss of vacuum in the hose in the event of engine failure. In the preferred embodiment illustrated, a T-coupling 610 is interposed in the hose 604 for connection of the hose 612 which leads to a vacuum storage tank 614. This tank is a convenient location for mounting the vacuum pressure switch 592 of the automatic parking brake system.

The signal chamber 158 of the transducer valve is connected through hose 616 to the inlet fitting 398 of the sensing valve (FIG. 10) communicating with the controlled vacuum chamber 396. The vacuum source chamber 362 of the sensing valve preferably is connected through the hose 618 to the outlet opening 578 of the switching valve (FIG. 12), mounted on the vehicle dash panel as by means of the bracket 558, for convenient manipulation by the driver. The vacuum inlet opening 570 of the swtiching valve is connected through the hose 620 to a T-coupling 622 inserted in the hose 604 leading to the intake manifold.

When the vehicle engine is started, the intake manifold evacuates the hoses and storage tank to maximum vacuum. In this condition the vacuum switch 592 is open and the solenoid operated check valve 590 opens the lines between the power unit pump output and the wheel cylinders. In the off position of the switching valve, the pin 568 is contained within the longitudinal groove 566 of the control shaft 556 and the latter thus bears against the seat 574 to close the vacuum source line 618 to the vacuum source chamber 362 of the sensing valve. When the control shaft is pulled outward and then rotated to confine the pin within the annular groove, the control shaft head 576 is removed from the seat 574 to allow communication between the vacuum inlet and outlet openings, to the sensing valve.

With full vacuum applied to the vacuum source chamber of the sensing valve, and the valve seat 358 displaced from its check seal 360, by virtue of the outward extension of the actuating rod 380, which corresponds to the normally retracted position of the overlay pedal 400, the vacuum source is connected to the controlled vacuum chamber 396 of the sensing valve. When the magnitude of vacuum in the controlled vacuum chamber 396 of the sensing valve reaches a value at which the force exerted by it on the diaphragm 342 matches the counter force of the spring 384, the diaphragm and its attached stem assembly is moved toward the left, closing the vacuum valve seat 358 against its check seal 360 and closing the air valve seat 368 against its check seal 370. In this condition the sensing valve is in a state of equilibrium providing maximum preset vacuum signal output. The maximum magnitude of vacuum in the controlled vacuum chamber thus achieved is adjustable over a substantial range by longitudinal adjustment of the adjustment cap 338, which establishes the limit of maximum extension of the actuating rod 380 and hence the maximum tension on the spring 384.

When the overlay pedal is rotated by the driver's foot to the position at which it just engages the underlying accelerator pedal 38, simultaneous rotation of the rod 420 and bell crank member causes the sensing valve actuating rod 380 to be retracted inwardly to its maximum limit, at which the spring guide 376 has forced the stem extension 374 to the left, closing the vacuum seat 358 against its seal and separating the air valve seat 368 from its seal. Thus, the controlled vacuum chamber is elevated to atmospheric pressure.

Infinite control of vacuum signal pressure, between the limits of zero and maximum pressures described hereinbefore, is achieved by manipulation of the overlay pedal by the driver's foot, to intermediate positions between the limits of zero and maximum pressures. For purposes of illustration, let it be assumed that, following a period of acceleration the driver wishes to brake the vehicle slowly. Accordingly, the driver eases foot pressure on the accelerator pedal, allowing the latter to return to idle position, and then allows the overlay pedal to retract from the accelerator pedal to some intermediate point. Thus, the connecting rod 420 rotates the bell crank member counterclockwise to cause a proportionate degree of extension of the sensing valve actuating rod 380 from its position of maximum retraction.

This extension of the actuating rod tensions the spring 384 proportionately, drawing the stem assembly and diaphragm toward the right, first closing the air valve seat 368 on its seal to isolate the air chamber from the controlled vacuum chamber, and then separating the vacuum valve seat 358 from its seal to connect the controlled vacuum chamber to the vacuum source.

The controlled vacuum chamber thus becomes evacuated to the degree corresponding to the tension of the spring 384, as explained hereinbefore, and this degree of vacuum is applied to the signal chamber hereinbefore, and this degree of vacuum is applied to the signal chamber of the transducer valve.

Assuming now that the transducer valve of FIG. 4 is employed in the system, the magnitude of signal vacuum supplied from the sensing valve to the signal chamber 158, creates a proportionate differential pressure across the diaphragm 156, forcing the latter and the attached stem assembly toward the left. This movement of the stem assembly results first in sealing of the pilot and secondary air valve seats 200 and 192 against their respective seals, in that order, and then separation of the pilot and secondary vacuum valve seats 202 and 204 from their respective seals. Vacuum thus is applied from the vacuum source of the intake manifold, through the controlled vacuum chamber 232 to the controlled vacuum chamber 56 of the diaphragm section 40 of the power unit. The diaphragm 58 and attached stem 70 thus are caused to move toward the left, the stem sealing against the check seal 106 on the shuttle valve 104 as it forces the shuttle valve ahead of it to pressurize the hydraulic fluid in the pump section 42 and wheel cylinders 18.

This increased hydraulic fluid pressure also is transmitted through the auxiliary outlet 138 into the transducer valve bore 218, where it is impressed against the piston end of the stem 178. When the force of hydraulic fluid pressure against the piston matches the opposing force of the signal vacuum in the chamber 158, the transducer valve reaches a state of equilibrium and the vacuum valve seats 200 and 204 close against their respective seals to isolate the vacuum source from the controlled vacuum chamber 232.

Further retraction of the overlay pedal results in a repetition of the foregoing procedure until the higher magnitude of vacuum in the signal chamber is balanced by a correspondingly higher hydraulic fluid pressure at the wheel cylinders and the transducer valve.

Since the magnitude of hydraulic fluid pressure applied to the wheel cylinders is a function of the magnitude of vacuum applied to the controlled vacuum chamber of the power unit diaphragm section, it will be understood that adjustment of the cap 338 on the sensing valve may be made to limit the maximum fluid pressure to the wheel cylinders to the desired condition of impending skidding.

To reduce the brake pressure, the driver presses upon the overlay pedal to return the latter toward the accelerator pedal. This results in corresponding retraction of the actuating rod 330 into the sensing valve, decreasing the tension on the spring 384. Since the force against the diaphragm 342 created by the vacuum in the controlled vacuum chamber 396 now exceeds the opposing force of the spring 384, the diaphragm and attached stem assembly is caused to move toward the left, opening the air valve seat 368 and admitting air to the controlled vacuum chamber 396 until the opposing forces are again balanced. The decrease in vacuum pressure in the controlled vacuum chamber also prevails in the signal chamber 158 of the transducer valve, thereby causing the diaphragm 156 and stem assembly to move toward the right to unseal the pilot and secondary air valve seats 200 and 192, in that order. The controlled vacuum chambers 232 and 56 in the transducer valve and diaphragm section of the power unit, respectively, thus are elevated toward atmospheric pressure, retracting the stem 70 and shuttle valve 104 and correspondingly reducing the hydraulic pressure to the wheel cylinders 18. When this hydraulic pressure has reduced to the extent that its force against the transducer valve stem 178 matches the opposing force of the decreased vacuum signal in the chamber 158, equilibrium again is reached and the air valve seats are closed against their respective seals.

When the vacuum operated transducer valve of FIG. 5 is substituted in the brake system of FIG. 1 for the hydraulic controlled transducer valve of FIG. 4, the system operation is substantially the same with the exception that the force exerted on the diaphragm 156 by the signal vacuum pressure applied through coupling 164, is balanced by the opposing force of the vacuum pressure developed in the controlled vacuum chambers 160 and 246, rather than by the hydraulic pressure applied against the stem piston from the auxiliary output of the power unit.

When the solenoid operated transducer valve of FIG. 6 is substituted in the brake system of FIG. 1 for either of the transducer valves of FIGS. 4 and 5, the sensing valve and its connection to the overlay pedal is replaced by the resistance assembly, as illustrated. Manipulation of the overlay pedal in the manner described hereinbefore, operates the resistance assembly and energizes the solenoid coil 250 in a manner to effect the same longitudinal force on the stem 178 as is effected by the vacuum signal applied from the sensing valve to the signal chamber 158. It will be understood that when the solenoid controlled valve of FIG. 6 is employed, the signal chamber is opened to the atmosphere rather than connected to the vacuum signal source of the sensing valve. Further, maximum hydraulic fluid pressure to the wheel cylinders may be controlled to the desired condition of impending skidding, by proper adjustment of the adjustment cap 280 which limits the maximum outward extension of the plunger 270 and hence the maximum voltage to the coil.

*System Assembly and Operation Vacuum Suspended Principle*

Referring now to FIG. 2 of the drawings, the brake system illustrated therein includes a pair of power units, one connected to the front wheel brakes 10 and the other to the rear wheel brakes 12. This arrangement also may be employed in the brake system of FIG. 1 and provides a safety feature described in detail hereinafter. A T-coupling 630 is inserted in the hydraulic line 24 for connection of the conduit 24'. In this manner the output of the master cylinder pump 26 is connected to the inlet openings 96 and 96' of the power unit pump sections 42 and 42', respectively. The main outlet openings 122 and 122' of the power unit pump sections are connected through the conduits 632 and 632' respectively, to the wheel cylinders of the front wheels 10 and rear wheels 12. The solenoid operated check valves 590 and 590' of the automatic parking brake assembly may be installed in these conduits, if desired, and connected in parallel in the circuit of the vacuum pressure switch 592.

In the embodiment illustrated, the transducer valve is of the vacuum controlled type shown in FIG. 8. The solenoid controlled transducer valve of FIG. 9 also may be employed without modification of the hydraulic system. However, if the hydraulic controlled transducer valve of FIG. 7 is to be used, it is preferred that a separate transducer valve be employed for each power unit, substantially as illustrated in FIG. 1, with both valves being connected to the intake manifold 606 for their source of vacuum.

In the arrangement shown in FIG. 2, the vacuum supply fitting 176 of the transducer valve is connected through the hose 604 to the intake manifold 606 of a vehicle engine, the check valve 608 and reservoir 614 being provided in the manner explained hereinbefore. In addition, the vacuum source also is connected through the hoses 634 and 634' to the nipples 82 and 82' communicating with the reference chambers 56 and 56' of the respective power unit diaphragm sections. The opening 230 communicating with the controlled vacuum chamber 246 of the transducer valve is connected through the hoses 636 and 636' and nipples 80 and 80' to the controlled vacuum chambers 54 and 54' of the respective power unit diaphragm sections.

It is to be noted that, whereas in the brake system of FIG. 1 the power unit diaphragm chamber 54 functions as the reference pressure chamber and the chamber 56 functions as the controlled vacuum chamber, the arrangement is reversed in the system of FIG. 2.

The signal chamber 158 of the transducer valve is connected through the hose 638 to the controlled vacuum chamber 520 of the sensing valve (FIG. 11), and the vacuum source chamber 522 of the sensing valve is connected through the hose 618 to the vacuum outlet 578 of the switching valve, the inlet 570 thereof being connected through the house 620 to the hose 604 leading to the inlet manifold 606.

With the vehicle engine operating and the switching valve control shaft extended outwardly, manifold vacuum is applied to the vacuum source chamber 522 of the sensing valve, with the result that the sensing valve actuating rod 508 is fully retracted and the overlay pedal 400 is supported by the bell crank member 542 in its position of full retraction above the accelerator pedal 38. The sensing valve stem and diaphragm assembly thus is moved toward the left, with the vacuum valve seat 480 closed against its seal and the air valve seat 478 separated from its seal.

When the magnitude of vacuum in the controlled vacuum chamber 520 reaches a reduced value at which the force exerted by the differential pressure across the diaphragm 468, equals the opposing force of the spring 498, determined by the setting of the adjustment nut 516, the sensing valve reaches a state of equilibrium in which both of the valve seats 478 and 480 are closed against their seals, and the controlled vacuum chamber 520 is at its maximum pressure, i.e., the pressure nearest atmospheric. This pressure is applied to the signal chamber 158 of the transducer valve.

When the pressure in the controlled vacuum chamber 246 matches the pressure in the signal chamber 158, the transducer valve is in a state of equilibrium with the air and vacuum valve seats closed against their respective seats. Thus, the controlled vacuum chamber 246 of the transducer valve and hence the controlled vacuum chambers 54 and 54' of the power unit diaphragm sections, are at maximum pressure toward atmospheric. Since the reference chambers 56 and 56' of the power unit diaphragm sections are at manifold vacuum, the diaphragm 58, stem 70 and shuttle valve 104 are moved toward the left to the limit established by the setting of the adjustment nut 516 on the sensing valve, applying the corresponding maximum hydraulic fluid pressure to the wheel cylinders.

Since the maximum hydraulic fluid pressure to the wheel cylinders is related to the maximum pressure differential between manifold vacuum and the atmosphere, it will be understood that the maximum fluid pressure required to attain the desired condition of the impending skidding of the wheels, may be obtained by proper setting of the adjustment nut on the control rod of the sensing valve.

The other conditions of operation of the transducer valves, i.e., the condition when the overlay pedal just engages the accelerator pedal at the idle position of the latter, and at points intermediate the limits of movement of the overlay pedal, will be readily apparent from a comparison of the operations of the transducer valves shown in FIGS. 4, 5 and 6 and described in detail hereinbefore.

It is to be noted that, in the event of failure of the brake system leading to either the front or rear wheels, generally occasioned by rupture of a wheel cylinder which results in loss of hydraulic fluid in the lines associated therewith, the power unit connected to the disabled system will bottom out, with the shuttle valve 104 and engaging stem 70 moved to the left (FIG. 3) to their extreme limit. Since hydraulic fluid from the master cylinder pump 26 cannot pass through the shuttle valve of the disabled power unit to be wasted through the ruptured wheel cylinder, it will be apparent that the disabled brake system is completely divorced from the operative system of the other pair of vehicle wheels, and manipulation either of the overlay pedal, or of the standard brake pedal 32, functions to operate the effective portion of the brake system. Accordingly, it will be appreciated that the dual power unit system described offers the advantage of providing the important safety factor of adequate braking in the event of failure of a portion of the entire braking system.

It is to be noted further that the standard brake pedal 32 is completely operative at all times, and may be employed as the only braking medium, as when the switching valve is adjusted to the off position, or may be employed to override and supplement the braking effort supplied by the power system. As explained hereinbefore, the power system is adjustable to provide the condition of impending skidding of the wheels, and therefore the use of the standard brake pedal to supplement the braking action of the power system, is not desired. The only condition under which additional braking effort might be desired, is in the event of brake fade which occurs when the brake drums and shoes become overheated to the extent that normal braking friction is diminished.

When the vehicle is to be parked, for example, the driver removes his foot from the overlay pedal, thereby applying maximum hydraulic fluid pressure to the wheel cylinders. After the vehicle engine has been stopped, the vacuum pressure in the reservoir 614 gradually rises toward atmospheric, and when it reaches a predetermined value the vacuum switch 592 closes automatically to complete the electric circuit of the solenoid operated check valve 590. This valve thereupon closes and seals the hydraulic line between the power unit pump and the wheel cylinders, thereby sealing the hydraulic pressure at the wheel cylinders and setting the wheel brakes to the extent sufficient for parking.

A particularly advantageous feature of the transducer valve constructions described herein resides in the provision of the pilot and secondary valve seats for air and vacuum, respectively. The smaller pilot valve seats respond to extremely small differential pressure signals while the larger secondary valve seats require larger signals for response. It is by this arrangement that the transducer valve output tracks the input signal instantly and precisely, with minimum hysteresis, thereby providing proper response and "feel" to the action of the driver's foot.

Another important contribution to proper braking action resides in the provision of the relatively massive stem head extension which functions as a dampener weight to eliminate vibration and flutter which is inherent in conventional valve systems, principally air or vacuum systems and, to a lesser degree, in hydraulic systems.

It will be apparent to those skilled in the art that various changes in the details of construction and arrangement of parts described hereinbefore may be made without departing from the spirit of this invention and the scope of the appended claims.

Having now described our invention and the manner in which the same may be used, what we claim as new and desire to secure by Letters Patent is:

1. A full power brake system comprising, in combination with brake operating means operable by fluid pressure, a fluid pressure power unit including a fluid pressure pump having an outlet connected to the brake operating means and a pump drive operable by a variable fluid pressure force to drive the pump and supply variable fluid pressure to the brake operating means, variable fluid pressure control means having a fluid pressure inlet and a variable fluid pressure outlet connected to the pump drive of the power unit, movable regulating means in the variable fluid pressure control means and operable by a signal force applied thereto to regulate the fluid pressure output from the latter in proportion to the signal force inducing movement of the movable regulating means, variable signal power means operatively connected with the movable regulating means for applying said signal force to the latter, and movable operating means operatively connected to the variable signal power means for providing the signal force to the movable regulating means in proportion to the position of the operating means.

2. The system of claim 1 including adjustable means arranged for engagement with the movable operating means for limiting the force applied to the movable regulating means to limit the maximum braking effort.

3. The system of claim 1 including fluid pressure limit valve means interconnecting the brake operating means and the power unit pump outlet and operable selectively upon a predetermined change in magnitude of the fluid pressure to the variable fluid pressure control means to seal the fluid pressure at the brake operating means against further reduction in pressure.

4. The system of claim 1 wherein the variable fluid pressure control means comprises a transducer valve having an air chamber communicating with the atmosphere, a vacuum supply chamber connected to a source of vacuum, a controlled vacuum chamber connected to the power unit, a fourth fluid pressure chamber, diaphragm means separating the controlled vacuum chamber and fourth chamber and movable under the influence of a differential pressure in said chambers, first valve means connected to the diaphragm means and releasably sealing the air chamber and the controlled vacuum chamber from each other, second valve means connected to the diaphragm means and releasably sealing the controlled vacuum chamber and vacuum supply chamber from each other, and resilient means operatively engaging the diaphragm means and normally urging one of the first and second valve means to sealing position and the other valve means to unsealing position, the variable signal power means being operatively connected with the diaphragm means for applying a force to the latter in the direction opposing the resilient means.

5. The system of claim 4 wherein the variable signal power means comprises a variable signal vacuum connected to the fourth chamber.

6. The system of claim 4 wherein the variable signal power means comprises solenoid means operatively engaging the diaphragm means and having an electric circuit, and variable resistance means in the electric circuit for varying the potential to the solenoid means.

7. The system of claim 1 wherein the variable signal power means comprises a fluid pressure sensing valve having a fluid pressure inlet connected to a source of fluid pressure, a fluid pressure outlet connected to the variable fluid pressure control means, and movable means in the sensing valve and operable by a force applied thereto to regulate the fluid pressure signal output from the latter in proportion to the force inducing said movement, the movable operating means being operatively connected to the last named movable means for providing the force to the latter in proportion to the position of the operating means.

8. The system of claim 1 wherein the variable signal power means comprises a sensing valve having an air chamber communicating with the atmosphere, a vacuum supply chamber connected to a source of vacuum, a controlled vacuum chamber connected to the variable fluid pressure control means, diaphragm means positioned between the controlled vacuum chamber and one of the air and vacuum supply chambers and movable under the influence of a differential fluid pressure in said separated chambers, first valve means engaging the diaphragm means and releasably sealing the air chamber and controlled vacuum chamber from each other, second valve means engaging the diaphragm means and releasably sealing the controlled vacuum chamber and vacuum supply chamber from each other, resilient means operatively engaging the diaphragm means and normally urging one of the first and second valve means to sealing position and the other valve means to unsealing position, the movable operating means operatively engaging the diaphragm means and operable to force the latter in the direction opposing the resilient means.

9. The system of claim 8 wherein the operating means of the sensing valve comprises a movable brake pedal, and resilient means operatively interengaging the brake pedal and diaphragm means.

10. The system of claim 8 wherein the operating means of the sensing valve comprises a movable brake pedal, piston means in the vacuum supply chamber of the sensing valve and connected to the brake pedal, and resilient means operatively interengaging the diaphragm means and piston means.

11. A full power brake system comprising, in combination with brake operating means operable by fluid pressure, a fluid pressure power unit including a fluid pressure pump having an outlet connected to the brake operating means and a pump drive force operable by a variable fluid pressure to drive the pump and supply variable fluid pressure to the brake operating means, a variable fluid pressure transducer valve operable by a variable fluid pressure signal and having a fluid pressure inlet connected to a source of fluid pressure, and a variable fluid pressure outlet connected to the pump drive of the power unit, and a variable fluid pressure signal inlet, a fluid pressure sensing valve having a fluid pressure inlet connected to a source of fluid pressure signal, a fluid pressure outlet connected to the signal inlet of the transducer valve, movable means in the sensing valve and operable by a force applied thereto to regulate the fluid pressure signal output from the latter in proportion to the force inducing said movement, and movable operating means operatively connected to the movable means for providing the force to the latter in proportion to the position of the operating means.

12. The system of claim 11 including adjustable switching valve means interconnecting the sensing valve inlet and the source of fluid pressure and operable in one position of adjustment to seal the fluid pressure source from the sensing valve inlet and to relieve the fluid pressure at the sensing valve inlet.

13. A full power brake system comprising, in combination with brake operating means operable by fluid pressure, a fluid pressure power unit including a hollow housing, movable diaphragm means separating the housing into a reference fluid pressure chamber and a variable fluid pressure chamber for developing a differential pressure across the diaphragm means for moving the latter, a fluid pressure pump operatively connected to the diaphragm means for operation by the latter, the pump having an outlet connected to the brake operating means, a transducer valve having an air chamber communicating with the atmosphere, a vacuum supply chamber connected to a source of vacuum, a controlled vacuum chamber connected to the variable fluid pressure chamber of the diaphragm section of the power unit, a signal vacuum chamber, diaphragm means separating the controlled vacuum chamber and signal vacuum chamber and movable under the influence of a differential fluid pressure in said chambers, first valve means connected to the diaphragm means and releasably sealing the air chamber and controlled vacuum chamber from each other, second valve means connected to the diaphragm means and releasably sealing the controlled vacuum chamber and vacuum supply chamber from each other, resilient means operatively engaging the diaphragm means and normally urging one of the first and second valve means to sealing position and the other valve means to unsealing position, a sensing valve having an air chamber communicating with the atmosphere, a vacuum supply chamber connected to a source of vacuum, a controlled vacuum chamber connected to the signal vacuum chamber of the transducer valve, diaphragm means positioned between the controlled vacuum chamber and one of the air and vacuum supply chambers and movable under the influence of a differential fluid pressure in said separated chambers, first valve means engaging the diaphragm means and releasably sealing the air chamber and controlled vacuum chamber from each other, second valve means engaging the diaphragm means and releasably sealing the controlled vacuum chamber and vacuum supply chamber from each other, resilient means operatively engaging the diaphragm means and normally urging one of the first and second valve means to sealing position and the other valve means to unsealing position, and movable operating means operatively engaging the diaphragm means and operable to force the latter in the direction opposing the resilient means and in proportion to the position of the movable operating means.

14. An accelerator controlled full power brake system for vehicles, comprising, in combination with wheel brake operating means operable by fluid pressure, a fluid pressure power unit including a fluid pressure pump having an outlet connected to the brake operating means and a pump drive operable by a variable fluid pressure to the brake operating means, variable fluid pressure control means having a fluid pressure inlet connected to a source of fluid pressure and a variable fluid pressure outlet connected to the pump drive of power unit, movable means in the variable fluid pressure control means and operable by a signal force applied thereto to regulate the fluid pressure output from the latter in proportion to the force inducing said movement, variable signal power means associated with the movable means for applying said signal force to the latter, movable operating means operatively connected to the variable signal power means for providing the force to the movable means in proportion to the position of the operating means and connector means connecting the movable operating means to a brake pedal mounted on the accelerator pedal of the vehicle.

15. The system of claim 14 including adjustable means operatively associated with the movable operating means for limiting the force applied to the movable means to limit the maximum braking effort to the wheels.

16. An accelerator controlled full power brake system for vehicles, comprising, in combination with wheel brake operating means operable by fluid pressure, a fluid pressure power unit including a hollow housing, movable diaphragm means separating the housing into a reference fluid pressure chamber and the variable fluid pressure chamber for developing a differential pressure across the diaphragm means for moving the latter, a fluid pressure pump operatively connected to the diaphragm means for operation by the latter, the pump having an outlet connected to the brake operating means, variable fluid pressure control means having a fluid pressure inlet connected to a source of fluid pressure and a variable fluid pressure outlet connected to the variable fluid pressure chamber of the power unit, movable means in the variable fluid pressure control means and operable by a signal force applied thereto to regulate the fluid pressure output from the latter in proportion to the force inducing said movement, variable signal power means associated with the movable means for applying said signal force to the latter, movable operating means operatively connected to the variable signal power means for providing the force to the movable means in proportion to the position of the operating means, and connector means connecting the movable operating means to a brake pedal mounted on the accelerator pedal of the vehicle.

17. An accelerator controlled full power brake system for vehicles, comprising, in combination with wheel brake operating means operable by fluid pressure, a pedal operated fluid pressure master pump, a fluid pressure power unit including a hollow housing, movable diaphragm means separating the housing into a reference fluid pressure chamber and a variable fluid pressure chamber for developing a differential pressure across the diaphragm means for moving the latter, a stem engaging the diaphragm means for movement therewith, the diaphragm means and stem being movable between a normal rest position when the fluid pressures in the chambers are substantially the same, and an extended position when the fluid pressures in the chambers are different from each other, a hollow cylinder receiving the stem slidably through one end thereof, a hollow shuttle valve in the cylinder arranged for sealing abutment by the stem during extension of the latter, the stem and shuttle valve being separated from each other when the stem is in normal rest position, the cylinder having a fluid pressure inlet connected to the master pump and located on the stem-abutting side of the shuttle valve when the stem is in rest position, the cylinder having a fluid pressure outlet connected to the brake operating means and located forwardly of the shuttle valve when the stem is in extended position, variable fluid pressure control means having a fluid pressure inlet connected to a source of fluid pressure and a variable fluid pressure outlet connected to the variable fluid pressure chamber of the power unit, movable means in a variable fluid pressure control means and operable by a signal force applied thereto to regulate the fluid pressure output from the latter in proportion to the force inducing said movement, variable signal power means associated with the movable means for applying said signal force to the latter, movable operating means operatively connected to the variable signal power means for providing the force to the movable means in proportion to the position of the operating means, and connector means connecting the movable operating means to a brake pedal mounted on the accelerator pedal of the vehicle.

18. An accelerator controlled full power brake system for vehicles, comprising, in combination with wheel brake operating means operable by fluid pressure, a fluid pressure power unit including a hollow housing, movable diaphragm means separating the housing into a reference fluid pressure chamber and a variable fluid pressure chamber for developing a differential pressure across the diaphragm means for moving the latter, a fluid pressure pump operatively connected to the diaphragm means for operation by the latter, the pump having an outlet connected to the brake operating means, a transducer valve having an air chamber communicating with the atmosphere, a vacuum supply chamber connected to a source of vacuum, a controlled vacuum chamber connected to the variable fluid pressure chamber of the diaphragm section of the power unit, a fourth fluid pressure chamber, diaphragm means separating the controlled vacuum chamber and fourth chamber and movable under the influence of a differential fluid pressure in said chambers, first valve means connected to the diaphragm means and releasably sealing the air chamber and controlled vacuum chamber from each other, second valve means connected to the diaphragm means and releasably sealing the controlled vacuum chamber and vacuum supply chamber from each other, resilient means operatively engaging the diaphragm means and normally urging one of the first and second valve means to sealing position and the other valve means to unsealing position, variable signal power means associated with the diaphragm means for applying a signal force to the latter in the direction opposing the resilient means, movable operating means operatively connected to the variable signal power means for providing the force to the movable means in proportion to the position of the operating means, and connector means connecting the movable operating means to a brake pedal mounted on an accelerator pedal of the vehicle.

19. The system of claim 18 wherein the power means comprises a variable signal vacuum connected to the fourth chamber.

20. The system of claim 18 wherein the power means comprises solenoid means operatively engaging the diaphragm means and having an electric circuit, and variable resistance means in the electric circuit and operable by the brake pedal to vary the potential to the solenoid means.

21. The system of claim 18 wherein the variable signal power means comprises a fluid pressure sensing valve having a fluid pressure inlet connected to a source of fluid pressure, a fluid pressure outlet connected to the fourth chamber of the transducer valve, and movable means in the sensing valve and operable by a force applied thereto to regulate the fluid pressure signal output from the latter in proportion to the force inducing said movement, the movable operating means being operatively connected to the last named movable means for providing the force to the latter in proportion to the position of the operating means.

22. The system of claim 18 wherein the variable signal power means comprises a sensing valve having an air chamber communicating with the atmosphere, a vacuum supply chamber connected to a source of vacuum, a controlled vacuum chamber connected to the fourth chamber of the transducer valve, diaphragm means positioned between the controlled vacuum chamber and one of the air and vacuum supply chambers and movable under the influence of a differential fluid pressure in said separated chambers, first valve means engaging the diaphragm means and releasably sealing the air chamber and controlled vacuum chamber from each other, second valve means engaging the diaphragm means and releasably sealing the controlled vacuum chamber and vacuum supply chamber from each other, resilient means operatively engaging the diaphragm means and normally urging one of the first and second valve means to sealing position and the other valve means to unsealing position, the movable operating means operatively engaging the diaphragm means and operable to force the latter in the direction opposing the resilient means.

23. The system of claim 18 including adjustable means operatively associated with the movable operating means for limiting the force applied to the diaphragm means to limit the maximum braking effort to the wheels.

24. An accelerator controlled full power brake system for vehicles, comprising, in combination with wheel brake operating means operable by fluid pressure, a pedal operated fluid pressure master pump, a fluid pressure power unit including a hollow housing, movable diaphragm means separating the housing into a reference fluid pressure chamber and a variable fluid pressure chamber for developing a differential pressure across the diaphragm means for moving the latter, a stem engaging the diaphragm means for movement therewith, the diaphragm means and stem being movable between a normal rest position when the fluid pressures in the chambers are substantially the same, and an extended position when the fluid pressures in the chambers are different from each other, a hollow cylinder receiving the stem slidably through one end thereof, a hollow shuttle valve in the cylinder arranged for sealing abutment by the stem during extension of the latter, the stem and shuttle valve being separated from each other when the stem is in normal rest position, the cylinder having a fluid inlet connected to the master pump and located on the stem-abutting side of the shuttle valve when the stem is in rest position, the cylinder having a fluid pressure outlet connected to the brake operating means and located forwardly of the shuttle valve when the stem is in extended position, a transducer valve having an air chamber communicating with the atmosphere, a vacuum supply chamber connected to a source of vacuum, a controlled vacuum chamber connected to the variable fluid pressure chamber of the diaphragm section of the power unit, a signal vacuum chamber, diaphragm means separating the controlled vacuum chamber and signal vacuum chamber and movable under the influence of a differential fluid pressure in said chambers, first valve means connected to the diaphragm means and releasably sealing the air chamber and controlled vacuum chamber from each other, second value means connected to the diaphragm means and releasably sealing the controlled vacuum chamber and vacuum supply chamber from each other, resilient means operatively engaging the diaphragm means and normally urging one of the first and second valve means to sealing position and the other valve means to unsealing position, a sensing valve having an air chamber communicating with the atmosphere, a vacuum supply chamber connected to a source of vacuum, a controlled vacuum chamber connected to the signal vacuum chamber of the transducer valve, diaphragm means positioned between the controlled vacuum chamber and one of the air and vacuum supply chambers and movable under the influence of a differential fluid pressure in said separated chambers, first valve means engaging the diaphragm means and releasably sealing the air chamber and controlled vacuum chamber from each other, second valve means engaging the diaphragm means and releasably sealing the controlled vacuum chamber and vacuum supply chamber from each other, resilient means operatively engaging the diaphraph means and normally urging one of the first and second valve means to sealing position and the other valve means to unsealing position, and movable operating means operatively engaging the diaphragm means and operable from the position of the accelerator pedal of the vehicle to force the diaphragm means in the direction opposing the resilient means and in proportion to the position of the movable operating means.

25. The system of claim 24 wherein the operating means of the sensing valve includes resilient means operatively interengaging the brake pedal and diaphragm means.

26. The system of claim 24 wherein the operating means of the sensing valve includes piston means in the vacuum supply chamber and connected to the brake pedal, and resilient means operatively interengaging the diaphragm means and piston means.

27. The system of claim 24 including adjustable means operatively associated with the sensing valve operating means for limiting the force applied to the diaphragm means of the sensing valve to limit the maximum braking effort to the wheels.

28. An accelerator controlled full power brake system for vehicles, comprising, in combination with first and second wheel brake operating means operable by fluid pressure, first and second fluid pressure power units each including a hollow housing, movable diaphragm means separating the housing into a reference air pressure chamber and a variable fluid pressure chamber for developing a differential pressure across the diaphragm means for moving the latter, a stem engaging the diaphragm means for movement therewith, the diaphragm means and stem being movable between a normal rest position when the fluid pressures in the chambers are substantially the same, and an extended position when the fluid pressures in the chambers are different from each other, a hollow cylinder receiving the stem slidably through one end thereof, a hollow shuttle valve in the cylinder arranged for sealing abutment by the stem during extension of the latter, the stem and shuttle valve being separated from each other when the stem is in normal rest position, the cylinder of each power unit having a fluid pressure outlet connected to the respective first and second brake operating means and located forwardly of the shuttle valve when the stem is in extended position, variable fluid pressure control means having a fluid pressure inlet connected to a source of fluid pressure and a variable fluid pressure outlet connected to the variable fluid pressure chamber of each power unit, movable means in the variable fluid pressure control means and operable by a signal force applied thereto to regulate the fluid pressure output from the latter in proportion to the force inducing said movement, variable signal power means associated with the movable means for applying said signal force to the latter, movable operating means operatively connected to the variable signal power means for providing the force to the movable means in proportion to the position of the operating means, and connector means connecting the movable operating means to a brake pedal mounted on the accelerator pedal of the vehicle.

29. A full power brake system comprising, in combination with brake operating means operable by fluid pressure, a fluid pressure power unit including a fluid pressure pump having an outlet connected to the brake operating means and a pump drive operable by a variable high volume fluid pressure force to drive the pump and supply variable fluid pressure to the brake operating means, a transducer valve having a high volume fluid pressure inlet connected to a source of high volume fluid pressure and a variable high volume fluid pressure outlet connected to the pump drive of the power unit, movable means in the transducer valve and operable by a signal force applied thereto to regulate the high volume fluid pressure output from the transducer valve in proportion to the force inducing movement of the movable means, variable signal power means associated with the movable means for applying said signal force to the latter, and movable operating means operatively engaging the variable signal power means for providing the signal force to the movable means in proportion to the position of the operating means.

30. An accelerator controlled full power brake system for vehicles, comprising, in combination with wheel brake operating means operable by fluid pressure, a fluid pressure power unit including a fluid pressure pump having an outlet connected to the brake operating means and a pump drive operable by a variable fluid pressure force to drive the pump and supply variable fluid pressure to the brake operating means, a transducer valve having a fluid pressure inlet connected to a source of fluid pressure and a variable fluid pressure outlet connected to the pump drive of the power unit, movable means in the transducer valve and operable by a signal force applied thereto to regulate the fluid pressure output from the transducer valve in proportion to the force inducing movement of the movable means, variable signal power means positioned adjacent the accelerator of the vehicle and having a movable member engaging the accelerator for movement thereby, the variable signal power means being adapted for connection to a source of signal power, flexible means operatively interconnecting the signal power means and the source of signal power, and flexible means operatively interconnecting the signal power means and the movable means of the transducer valve.

31. The accelerator controlled full power brake system of claim 30 wherein the transducer valve inlet is connected to a source of high volume vacuum, the signal power means comprises a low volume vacuum sensing valve, and the flexible means comprise flexible conduits.

32. The accelerator controlled full power brake system of claim 30 wherein the transducer valve inlet is connected to a source of high volume vacuum, the signal power means comprises a variable resistance, the movable means of the transducer valve comprises the armature of an electric solenoid, and the flexible means comprise electric conductors forming an electric circuit of the variable resistance, the electric solenoid and a source of electric potential.

References Cited in the file of this patent
UNITED STATES PATENTS

| | | |
|---|---|---|
| 2,051,906 | Sanford | Aug. 25, 1936 |
| 2,177,471 | Baade | Oct. 24, 1939 |
| 2,362,723 | Sanford | Nov. 14, 1944 |
| 2,515,951 | Down | July 18, 1950 |
| 2,643,746 | Righter | June 30, 1953 |
| 2,845,147 | Hill | July 29, 1958 |
| 2,881,879 | Perrino | Apr. 14, 1959 |